United States Patent [19]

Shibuya

[11] Patent Number: 4,764,861

[45] Date of Patent: Aug. 16, 1988

[54] INSTRUCTION FPEFETCHING DEVICE WITH PREDICTION OF A BRANCH DESTINATION FOR EACH BRANCH COUNT INSTRUCTION

[75] Inventor: Toshiteru Shibuya, Tokyo, Japan

[73] Assignee: NEC Corporation, Tokyo, Japan

[21] Appl. No.: 699,328

[22] Filed: Feb. 7, 1985

[30] Foreign Application Priority Data

Feb. 8, 1984 [JP] Japan .................................. 59-21114
Feb. 21, 1984 [JP] Japan .................................. 59-30672

[51] Int. Cl.⁴ .............................................. G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,559,183 | 1/1971 | Sussenguth | 364/200 |
| 3,593,306 | 7/1971 | Toy | 364/200 |
| 3,736,567 | 5/1973 | Lotan et al. | 364/200 |
| 3,940,741 | 2/1976 | Horikoshi et al. | 364/200 |
| 4,200,927 | 4/1980 | Hughes et al. | 364/200 |
| 4,430,706 | 2/1984 | Sand | 364/200 |
| 4,435,756 | 3/1984 | Potash | 364/200 |
| 4,471,433 | 9/1984 | Matsumoto | 364/200 |
| 4,477,872 | 10/1984 | Losq et al. | 364/200 |
| 4,604,691 | 8/1986 | Akagi | 364/200 |

OTHER PUBLICATIONS

J. Gonzalez, M. Gonzalez, "Branch Mechanism for Program Loops", vol. 25, No. 9, Feb. 1983, pp. 4569–4571, IBM Tech. Disc. Bulletin.

*Primary Examiner*—Gareth D. Shaw
*Assistant Examiner*—John G. Mills, III
*Attorney, Agent, or Firm*—Foley & Lardner, Schwartz, Jeffery, Schwaab, Mack, Blumenthal & Evans

[57] ABSTRACT

Instruction of a loop are repeatedly prefetched with a branch history table (46) made to store a predicted branch direction of "go" to branch for a branch count instruction of the loop. The loop is left without renewing the predicted branch direction when a prediction evaluating circuit (66) finds that the predicted branch direction is incorrect. Alternatively, the predicted branch direction is temporarily renewed to "no go" to branch during penultimate execution of the branch count instruction before leave of the loop and then renewed back to "go" to branch during ultimate execution of the branch count instruction on leaving the loop. It is possible in either event to again enter the loop at once. Only when there is no data for a branch count instruction, the predicted branch direction must be stored in the branch history table together with a predicted branch destination address for an instruction which stands foremost in the loop. Renewal of the branch history table is not different in this event from the renewal carried out when the prediction evaluating circuit finds incorrectness of prediction for a branch instruction which is not a branch count instruction.

16 Claims, 20 Drawing Sheets

FIG. 26

| | BCT BIT | BD | CT | V | COINC | PF | BH | GO |
|---|---|---|---|---|---|---|---|---|
| 1 | 0 | 0 | — | 0 | — | 0 | 0 | — |
| 2 | 0 | 0 | — | 1 | 0 | 1 | 1 | 0 |
| 3 | 0 | 0 | — | 1 | 1 | 1 | 1 | 0 |
| 4 | 0 | 1 | — | 0 | — | 1 | 1 | 1 |
| 5 | 0 | 1 | — | 1 | 0 | 1 | 1 | 1 |
| 6 | 0 | 1 | — | 1 | 1 | 0 | 0 | — |
| 7 | 1 | 0 | — | 0 | — | 0 | 1 | 1 |
| 8 | 1 | 0 | — | 1 | 0 | 1 | 1 | 1 |
| 9 | 1 | 0 | — | 1 | 1 | 1 | 0 | — |
| 10 | 1 | 1 | 0 | 0 | — | 1 | 1 | 1 |
| 11 | 1 | 1 | 0 | 1 | 0 | 1 | 1 | 1 |
| 12 | 1 | 1 | 0 | 1 | 1 | 0 | 0 | — |
| 13 | 1 | 1 | 1 | 0 | — | 1 | 0 | — |
| 14 | 1 | 1 | 1 | 1 | 0 | 1 | 1 | 0 |
| 15 | 1 | 1 | 1 | 1 | 1 | 0 | 1 | 0 |

INSTRUCTION FPEFETCHING DEVICE WITH PREDICTION OF A BRANCH DESTINATION FOR EACH BRANCH COUNT INSTRUCTION

BACKGROUND OF THE INVENTION

This invention relates to an instruction prefetching device for use in a data or information processing system in prefetching an instruction sequence including a branch instruction which may or may not be a branch count instruction.

In prior-art instruction prefetching devices, a considerably long loss cycle is inevitable whenever a branch instruction appears in the instruction sequence and particularly when the branch instruction is a branch count instruction.

An improved instruction prefetching device is described in principle in an article contributed by Erich block et al to IEEE, Computer, April 1978, pages 64–76, under the title of "Component Progress: Its Effect on High-Speed Computer Architecture and Machine Organization" and is disclosed as a practical structure in U.S. patent application Ser. No. 198,990 (now U.S. Pat. No. 4,370,711) filed Oct. 21, 1980, by James Edward Smith. According to Unexamined Publication No. 76, 638 of 1982 of the corresponding Japanese patent application filed by Control Data Corporation, the assignee, prefetch of the instruction sequence is carried out upon appearance of a branch instruction by predicting a branch destination or target based on prior results of actual execution of the branch instruction in question. When the prediction is correct, the prefetch proceeds without the loss cycle. The loss cycle, however, becomes three machine cycles long when the prediction fails. In the manner which will later be described with reference to one of about thirty figures of the accompanying drawing, the loss cycle amounts to a little longer than two machine cycles on the average.

An instruction prefetching device based on a different principle, is revealed in U.S. patent application Ser. No. 415,709 (now U.S. Pat. No. 4,604,691) filed Sept. 7, 1982, by Masanobu Akagi, for assignment to the present assignee. The basic Japanese patent application was filed by NEC Corporation, the assignee, and is published under Unexamined Publication No. 59,253 of 1982. The device includes an instruction cache memory which comprises a plurality of instruction blocks for holding copies of a portion of an instruction area of a main memory. A branch information memory comprises a plurality of information blocks which correspond to the respective instruction blocks. When a branch instruction is held in one of the instruction blocks, the corresponding information block is loaded with a result of execution which has ever been carried out on the branch instruction. Another information block is loaded with an address of an instruction block. The last-mentioned instruction block holds an instruction which should very likely be prefetched next subsequent to the branch instruction. An access to the first-mentioned instruction block and simultaneously to the corresponding information block, is followed by an access to the other information block. An instruction sequence is prefetched at an appreciably high speed. The device is, however, capable of attaining a low accuracy of prefetch due to the prediction by block-to-block correspondence when two or more branch instructions are held in an instruction block.

A later patent application was filed Nov. 16, 1983, under U.S. patent application Ser. No. 552,223 by Syuichi Hanatani et al, including the present applicant and the above-named Masanobu Akagi, for assignment to the instant assignee (EPC Patent Application No. 83 111 451.7). According to the later patent application, an instruction prefetching device is for use in carrying out prefetch of an instruction sequence in a data processing system including an executing unit and comprises a branch history table. In the manner which will later be described more in detail, a plurality of entry pairs are stored in the branch history table. Each entry pair comprises a first and a second entry. The first entry specifies an instruction address of a branch instruction which should be executed by the executing unit prior to prefetch of the instruction sequence. The second entry specifies branch information which comprises a branch destination address obtained by previous execution of the branch instruction. The second entry corresponds to the first entry in this manner as regards each branch instruction. On prefetching an instruction of the instruction sequence, the branch history table is retrieved in search of one of the first entries of the entry pairs in response to a current instruction address of the instruction being prefetched as a current instruction. If one of the first entries is located that specifies an instruction address coincident with the current instruction address, the branch history table produces a corresponding second entry. Prefetch of the instruction sequence is controlled in response to the corresponding second entry. According to the elder patent application, the loss cycle is only one machine cycle long on the average.

The branch instruction may, however, be a branch count instruction which specifies one of a plurality of general purpose registers of the executing unit so as to administrate the number of times of repeated execution of instructions along a loop until a count becomes a predetermined number when the loop is eventually left. In this event, the loss cycle becomes long in the manner which will later become clear.

SUMMARY OF THE INVENTION

It is therefore a general object of the present invention to provide an instruction prefetching device operable with only a short average loss cycle to prefetch an instruction sequence including a branch instruction even when the branch instruction is a branch count instruction.

It is a specific object of this invention to provide an instruction prefetching device of the type described, which is capable of reducing the average loss cycle to only about one machine cycle.

It is another specific object of this invention to provide an instruction prefetching device of the type described, by which it is possible to accurately prefetch an instruction sequence.

Other objects of this invention will become clear as the description proceeds.

According to this invention, there is provided an instruction prefetching device for use in carrying out prefetch of an instruction sequence in a data processing system which includes an executing unit. The instruction prefetching device comprises a branch history table for storing a plurality of entry pairs. Each entry pair comprises a first entry specifying an instruction address of a branch instruction executed by the executing unit prior to the prefetch and a second entry specifying branch information which comprises a branch destination address obtained by previous execution of the branch instruction. The second entry corresponds to the first entry as regards each branch instruction. The instruction prefetching device further comprises retrieving means for retrieving the branch history table for one of the first entries of the entry pairs in response to a current instruction address of a current instruction being prefetched to make the branch history table produce a corresponding second entry, and discriminating means for discriminating whether the branch instruction is a branch count instruction or a branch instruction other than the branch count instruction. The discriminating means thereby produces a result of discrimination. The instruction prefetching device still further comprises prefetching means responsive to the corresponding second entry and the result of discrimination for carrying out the prefetch.

BRIEF DESCRIPTION OF THE DRAWING

FIG. 26 is a diagram for use in describing operation of the prediction evaluating circuit shown in FIG. 25;

DESCRIPTION OF THE PREFERRED EMBODIMENTS

Figure 1:
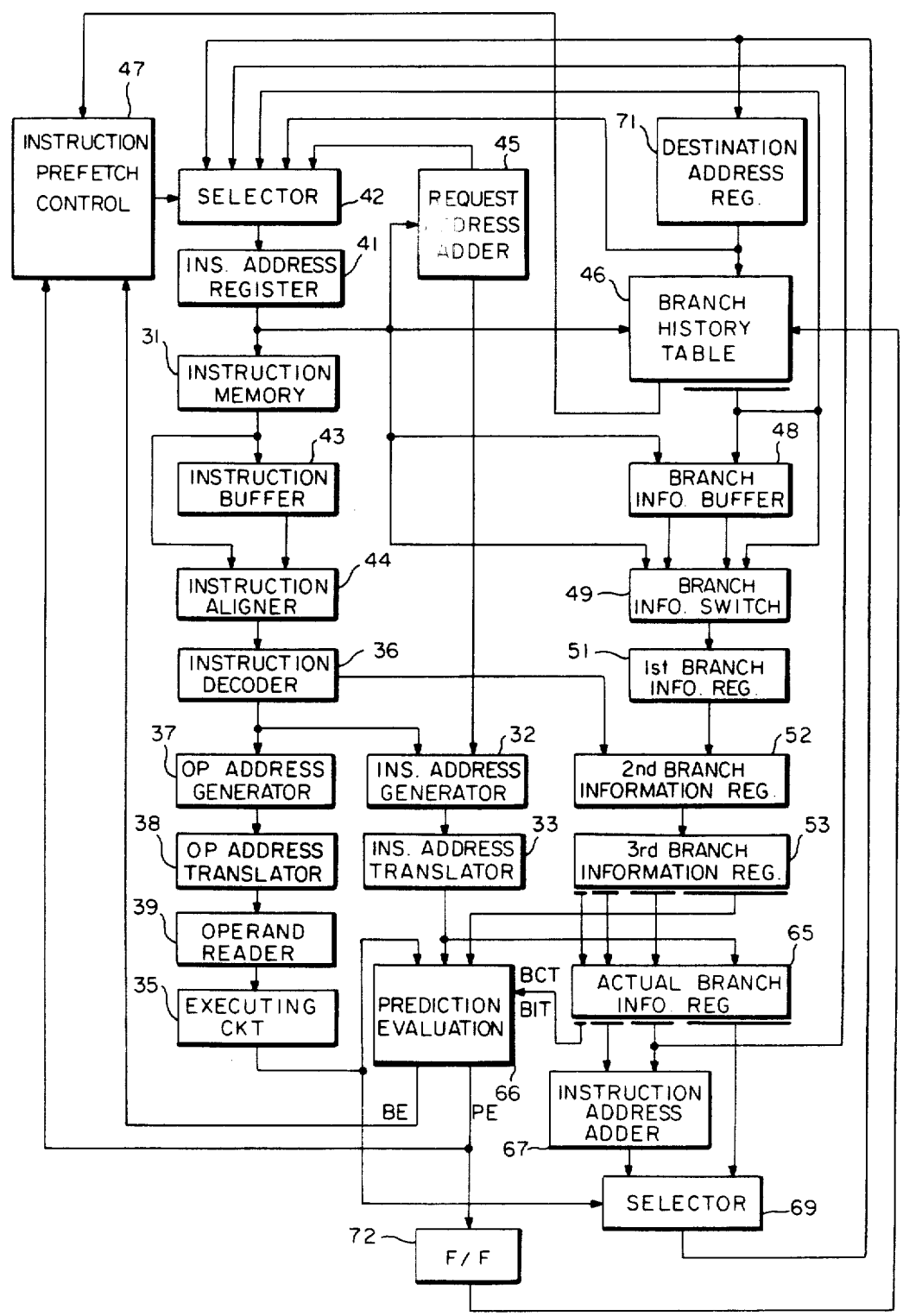
FIG. 1 is a block diagram of a data processing system which comprises an instruction prefetching device according to a first embodiment of the instant invention.

Referring to FIG. 1, a data or information processing system comprises an instruction prefetching device according to a first embodiment of the present invention. Before describing the instruction prefetching device, an example of the data processing system will be described in order to facilitate an understanding of this invention.

It is known in the art that a data processing system is divisible into a plurality of units as, for example, an instruction memory unit 31, an instruction address generating circuit 32, an instruction address translating circuit 33, an instruction executing circuit 35, an instruction decoding circuit 36, an operand address generating circuit 37, an operand address translating circuit 38, and an operand reading unit 39. The instruction memory unit 31 for storing a plurality of instructions. The operand reading unit 39 includes an operant memory (not shown). As the case may be, a combination of the instruction address generating circuit 32, the instruction address translating circuit 33, the instruction executing circuit 35, and the instruction decoding circuit 36, is called an instruction executing unit.

Although not depicted, a main memory may be used in common with the instruction memory unit 31 and the operand memory of the operand reading unit 39. Address generating and translating units may be used in common with the instruction address generating circuit 32 and the operand address generating circuit 37 and with the instruction address translating circuit 33 and the operand address translating circuit 38.

The data processing system may comprise several resources (not shown). By way of example, the instruction memory unit 31 and the operand memory may comprise instruction and operand cache memories. Each cache memory gives a copy of a portion of the instruction memory unit 31 and the operand memory. Each of the instruction and the operand address translating circuits 33 and 38 may comprise an address translating buffer. If necessary, reference should be made in regards to the instruction and the operand cache memories and made in regards to the instruction and the operand address translating circuits 33 and 38 either to U.S. patent application Ser. No. 214,932 (now U.S. Pat. No. 4,502,110) filed Dec. 10, 1980, by Masato Saito or to Unexamined Publication No. 87,282 of 1981 of the basic Japanese patent application filed by NEC Corporation, the assignee.

Figure 2:
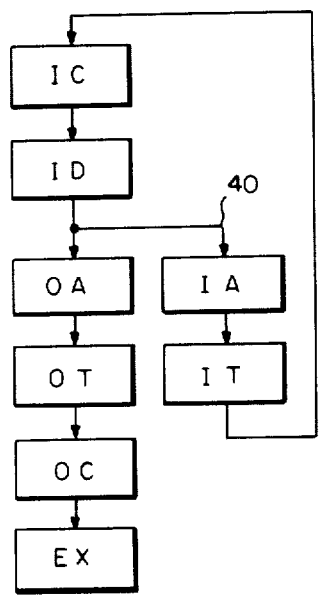
FIG. 2 is a diagram for use in describing operation of the data processing system illustrated in FIG. 1.

Referring to FIG. 2, it is possible to understand that each instruction is executed generally on eight following stages.

(1) IA stage: The instruction address generating circuit 32 generates an instruction address (a logical address) of an instruction to be executed;

(2) IT stage: The instruction address translating circuit 33 translates the instruction address to a real instruction address;

(3) IC stage: The real instruction address is used in reading the instruction from the instruction memory unit 31 or preferably from the instruction cache memory;

(4) ID stage: The instruction decoding circuit 36 decodes the instruction to provide a result of decoding;

(5) OA stage: Responsive to the result of decoding, the operand address generating circuit 37 generates an operand address (a logical address) of an operand;

(6) OT stage: The operand address translating circuit 38 translates the operand address to a real operand address;

(7) OC stage: Responsive to the real operand address, the operand reading unit 39 produces the operand;

(8) EX stage: The instruction executing circuit 35 executes the instruction.

Use of the above-exemplified resources makes it possible to process the IT and the OT stages and the IC and the OC stages at a high speed. Furthermore, the data processing system is enabled to execute a sequence of instructions under an eight-stage pipeline control.

Figure 3:
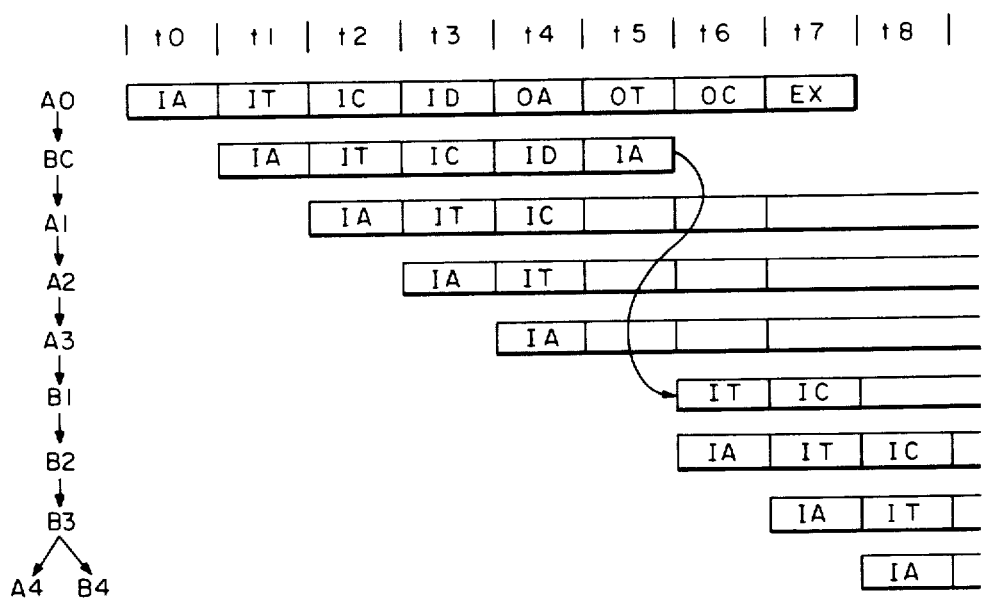
FIG. 3 is a diagram for use in describing operation of a prior-art instruction prefetching device.

Referring to FIG. 3, it will be assumed that the data processing system executes a sequence of instructions A0, BC, A1, A2, A3, A4, ..., B1, B2, B3, B4, and so forth. In the instruction sequence, a branch condition instruction A0 is immediately followed by a branch instruction BC. It is to be noted here that a branch instruction BC is not a branch count instruction described heretobefore unless specifically so called and denoted by BCT. In compliance with a branch condition which becomes evident by execution of the branch condition instruction A0, the branch instruction BC indicates either of two branch directions, in which a stream of execution of the instruction sequence proceeds to a first partial sequence of instructions A1 and so on and to a second partial sequence of instructions B1 and the like, respectively. It should be noted that the first partial sequence next follows the branch instruction BC in the instruction sequence and that the second partial sequence follows the first partial sequence. The second partial sequence may alternatively be called by a branch.

When the branch condition indicates "no go" to the branch, the first partial sequence is prefetched prior to prefetch of the second partial sequence. When the branch condition indicates "go" to the branch, the second partial sequence is prefetched before the first partial sequence. The first partial sequence is said to be on a "no go" to branch side and the second partial sequence, on a "go" to branch side. The instruction A1 or B1 which stands foremost in each partial sequence, is called a branch destination or target instruction depending on the branch condition.

It will now be presumed that the eight above-described stages IA through EX are dealt with under the eight-stage pipeline control for the instruction sequence being exemplified. If the IA through the EX stages are carried out for the branch condition instruction A0 at zeroth through seventh instants t0, t1, t2, t3, t4, t5, t6, and t7, respectively, the IA through the ID stages are carried out for the branch instruction BC at the first through the fourth instants t1 to t4, respectively. Two adjacent instants, such as t0 and t1, are spaced apart by one machine cycle.

According to the prior art, such an instruction sequence is prefetched with a branch prediction or presumption such that the branch condition always indicates "go" to the branch. In this event, the prediction for the "go" to branch side becomes known when the branch instruction BC is actually decoded at the fourth instant t4. In the meanwhile, the IA stage is carried out at the second through the fourth instants t2 to t4 for prefetch of those three instructions A1 through A3, respectively, which are on the "no go" to branch side.

As indicated in FIG. 2 by a line 40 with an arrowhead, the ID stage is carried out at the fourth instant t4 on the branch instruction BC and is followed by the IA stage carried out thereon at the fifth instant t5 to give an instruction address of the branch destination instruction B1 in compliance with the prediction for "go" to the branch. The instruction address of a branch destination instruction on that one of the "no go" and the "go" to branch sides to which the stream should flow, is herein called a branch destination or target address.

The IA stage is carried out at the sixth and the seventh instants t6 and t6 for prefetch of those two more instructions B2 and B3, respectively, which are on the "go" to branch side. At the seventh instant t7, the branch condition is rendered evident by a result of the EX stage of the branch condition instruction A0 in the manner described hereinabove. It is now possible to evaluate or confirm whether the prediction for the "go" to branch side has really been correct or incorrect. If the prediction is correct or successful, the instructions B1 and others are prefetched. If the prediction fails, namely, if the prediction is incorrect or unsuccessful, the instructions A1 and so forth are prefetched. At an eighth instant t8 and thereafter, the instruction sequence is prefetched along a proper or pertinent stream either for the instruction A4 or for the instruction B4.

The branch prediction may always be to the "no go" to branch side rather than towards the "go" to branch side in the manner thus far been described. In either event, a loss cycle of three machine cycles is unavoidable irrespective of corrrectness and failure of the prediction whenever a branch instruction appears in the instruction sequence.

Figure 4:
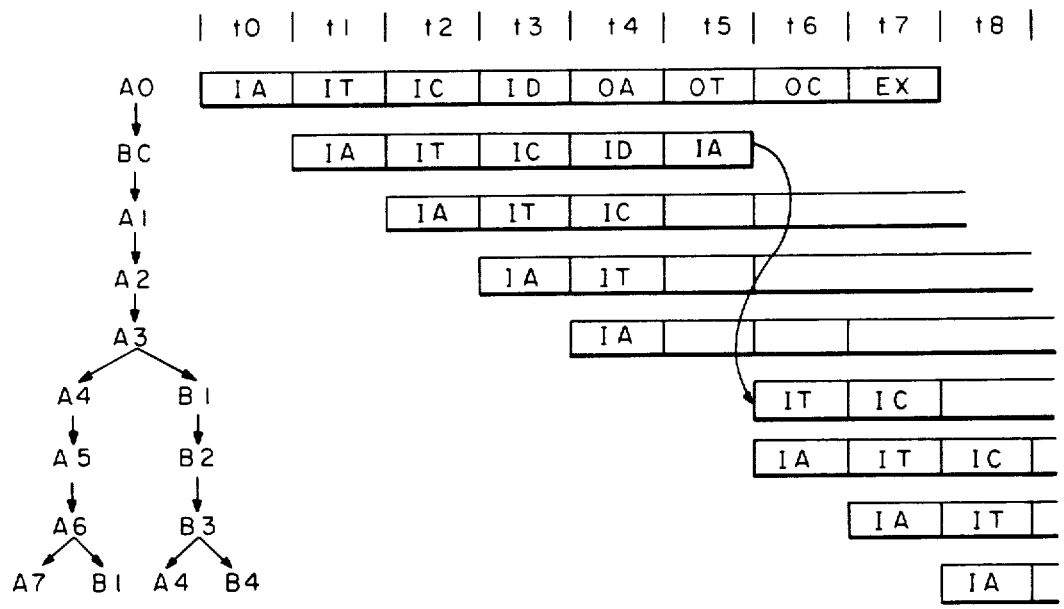
FIG. 4 is a diagram for use in describing operation of an improved prior-art instruction prefetching device.

Turning to FIG. 4, an instruction sequence of the type being exemplified, is prefetched as follows by an improved instruction prefetching device disclosed in the above-cited Smith patent application. According to the above-referenced Unexamined Publication No.

76,638 of 1982, prediction is carried out for each branch instruction by reference to a branch pointer flag indicative of either of the "no go" and the "go" to branch sides based on prior results of actual execution of the branch instruction in question.

In the manner described before in conjunction with FIG. 3, the IA stage is carried out at the zeroth through the fourth instants t0 to t4 for prefetch of the branch condition instruction A0, the branch instruction BC, and the three instructions A1 through A3 on the "no go" to branch side, respectively. Concurrently with the IA stage for the instruction A3, the ID stage is carried out for the branch instruction BC at the fourth instant t4. Decision is thereby given whether the process should proceed to the "no go" to branch side or to the "go" to branch side. Depending on the decision, the IA stage is carried out at the fifth through the seventh instants t5 to t7 either for prefetch of three instructions A4, A5, and A6 on the "no go" to branch side or for prefetch of three instructions B1, B2, and B3 on the "go" to branch side. The branch condition becomes evident at the seventh instant t7 as a result of execution of the branch condition instruction A0.

If the "no go" to branch side is predicted to the fourth instant t4 and found to be really correct at the seventh instant t7, the IA stage is carried out at the eighth instant t8 for prefetch of the instruction A7 which next follows on the "no go" to branch side. If the prediction is also "no go" to branch and is decided to be incorrect, the IA stage is carried out at the eighth instant t8 for prefetch of the foremost instruction B1 on the "go" to branch side.

If the prediction is "go" to the branch and is correct, the IA stage is carried out at the eighth instant t8 for prefetch of the instruction B4 which next follows the instruction B3 on the "go" to branch side. If the prediction is "go" to the branch and is incorrect, the IA stage is carried out at the eighth instant t8 for prefetch of the instruction A4 which is next subsequent to the instruction A3 on the "no go" to branch side. At any rate, the instruction sequence is prefetched along a proper stream at the eighth instant t8 and later.

The loss cycle is three machine cycles long if the prediction is "go" to the branch and is either correct or incorrect, nil if the prediction is "no go" to the branch and is correct, and six machine cycles long if the prediction is "no go" to the branch and fails. A degree $\alpha$ of correctness of the prediction, namely, the probability that the prediction is correct, is appreciably high because the prediction is based on prior results. It has been confirmed that the degree $\alpha$ is about 0.8. It is possible to surmise that "go" to the branch and "no go" to the branch occurs at a rate of fifty to fifty. In other words, each of "go" and "no go" to the branch occurs at a probalility $\gamma$ of 0.5. Under the circumstances, an average loss cycle of:

$$3.\gamma.\alpha + 0.(1-\gamma).\alpha + 3.\gamma.(1-\alpha) + 6.(1-\gamma).(1-\alpha) = 2.1 \text{ (machine cycles)},$$

is inevitable upon appearance of each branch instruction.

Referring back to FIG. 1, the data processing system comprises an instruction address register 41 in which request addresses are set one at a time as a current request address IAR through a request address selector 42 as will later be described in detail. Accessed by the current request address, the instruction memory unit 31 produces a block of an instruction word as a current instruction. It will be assumed merely for convenience of description that the instruction word produced in response to each request, is eight bytes long.

Figure 5:
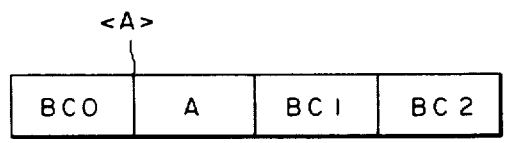
FIG. 5 shows an instruction word.

Turning to FIG. 5, an instruction word usually consists of a plurality of instructions. The illustrated instruction word consists of four two-byte instructions BC0, A, BC1, and BC2. In the manner which will presently become clear, the instructions may have different instruction code lengths.

Turning back to FIG. 1, the instruction words are successively read out of the instruction memory unit 31 and are temporarily stored in an instruction buffer 43 as a queue. An instruction aligner 44 is for delivering the instruction words one by one from the instruction buffer 43 to the instruction decoding circuit 36. Only when the instruction buffer 43 is empty, the instruction aligner 44 supplies the instruction decoding circuit 36 with the instruction word currently read out of the instruction memory unit 31.

A request address adder 45 is for adding eight to the current request address supplied from the instruction address register 41 to provide a next request address. When selected by the request address selector 42 in the manner which will later be described, the next request address is substituted as a new current request address in the instruction address register 41 for the previous current request address so as to prefetch a next subsequent instruction word from the instruction memory unit 31 as a new current instruction.

According to the embodiment being illustrated, the instruction prefetching device comprises a branch history table 46. In the manner which will shortly be described in detail, data stored in the brach history table 46 is retrieved by the current request address supplied from the instruction address register 41 to produce branch information in general if the instruction word currently read out of the instruction memory unit 31 comprises a branch instruction which may be either of a branch count instruction and a branch instruction other than the branch count instruction.

Figure 6:
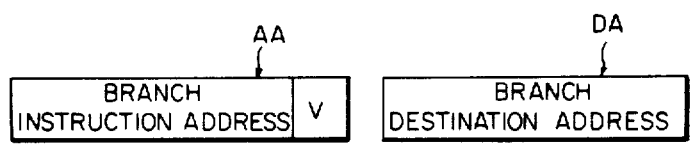
FIG. 6 shows a pair of entries in a branch history table used in the instruction prefetching device illustrated in FIG. 1.

Turning to FIG. 6, the branch history table 46 is for storing a plurality of entry pairs. Each entry consists of a first or address entry AA and a second or data entry DA for each branch instruction which has ever been executed. The first and the second entries of each pair therefore correspond to each other. The first entry AA is address information which specifies an instruction address of the branch instruction under consideration as a branch instruction address. The second entry DA is the above-mentioned branch information and comprises a branch destination address which has been obtained by actual execution of the branch instruction in question.

When the current request address comprises a branch instruction address specified by one of the first entries, the branch history table 46 produces the branch information of the corresponding second entry. The second entry corresponding to the above-mentioned one of the first entries, specifies the branch destination address as a predicted branch destination address. When the current request address comprises a branch instruction address specified by none of the first entries, the current request address is dealt with as if not including a branch instruction address even though the current instruction word may comprise a branch instruction. Such a branch instruction is treated in this event as though indicative of "no go" to the branch irrespective of the branch direction indicated by that branch instruction.

It is preferred that the first entry AA indicates a real address of the branch instruction. It will be presumed that a first and a second part of the real instruction address is given by fourth through seventeenth bits and twenty-ninth and thirtieth bits of the request address IAR(:4–17) and IAR(:29, 30), respectively. Preferably, the branch destination address DA is also a real address.

It is also preferred that the branch information further comprise a validity flag V which indicates validity of the branch information and, at the same time, the branch direction. For example, the validity flag V is a one-bit flag. A binary one validity flag indicates "go" to the branch and the validity of branch information. A binary zero validity bit indicates "no go" to the branch and that the branch information is void. It is to be noted in connection with FIG. 6 that the validity flag or bit V is depicted contiguous to the real branch instruction address as if a part of the first entry AA rather than contiguous to the real branch destination address as a part of the second entry DA. This is merely for convenience of description as will later become clear.

In FIG. 1, the branch history table 46 furthermore produces in the manner later described an address hit signal indicative of whether or not the current request address used for retrieval, comprises a branch instruction address specified by one of the first entries. The address hit signal is delivered to an instruction prefetch control unit 47 as one of three input signals thereof. It is possible to understand as will later become clear that the address hit signal serves as a predicted branch direction signal indicative of either of the "no go" and the "go" to branch side as a predicted branch direction.

In the embodiment being illustrated, a branch information buffer 48 has an address information and a branch information field partitioned in FIG. 1 by a thin vertical line. Concurrently with accumulation of the instruction words in the instruction buffer 43 in response to successive request addresses, branch instruction addresses included in the successive request addresses are successively from the instruction address register 41 and are accumulated in the address information field of the branch information buffer 48. The branch information produced by the branch history table 46 in response to each branch instruction address, is accumulated in the branch information field of the branch information buffer 48. A branch information switch 49 corresponds to the instruction aligner 44.

Figure 7:
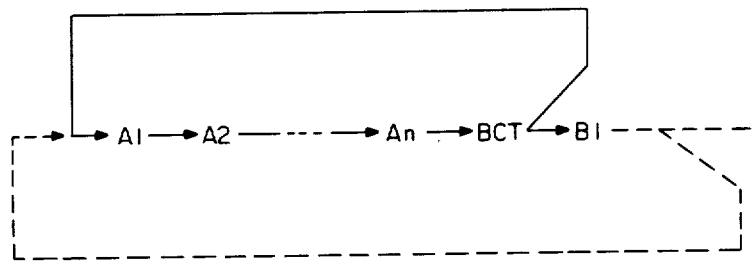
FIG. 7 shows a sequence of instructions, some of which are repeatedly executed a predetermined number of times in response to a branch count instruction.

Turning to FIG. 7, a sequence of instructions is exemplified wherein first through n-th instructions A1 to An are followed by a branch count instruction BCT and then by another instruction B1. Due to the branch count instruction BCT which indicates "go" to the branch unless a count reaches the predetermined number describedobefore, a partial sequence of the first through the n-th instructions A1 to An and the branch count instruction BCT serves as a branch. The branch count instruction BCT indicates in general the first instruction A1 as a branch destination instruction. A loop of the first through the n-th instructions A1 to An and the branch count instruction BCT is repeatedly executed. As soon as the count reaches the predetermined number, the branch count instruction indicates leave of the loop, namely, the "no go" to branch side. The other instruction B1 is indicated as another branch destination instruction.

It is already described in conjunction with FIG. 4 that the average loss cycle is 2.1 machine cycles long according to the Smith patent application, and will later be described that the use of the branch history table 46 and the related circuitry makes it possible to shorten the average loss cycle to only one machine cycle if the branch instruction is not a branch count instruction BCT. The average loss cycle, however, becomes longer when the branch instruction is a branch count instruction BCT. In the above-described ID stage, the instruction decoding circuit 36 (FIG. 1) produces a BCT bit which may be logic one or zero when the current instruction is a branch count instruction BCT or is not, respectively.

Figure 8:
FIG. 8 shows an entry in a branch information register used in the instruction prefetching device depicted in FIG. 1.

Further turning to FIG. 8, it will be surmised in the following that the branch information includes the validity bit V in the manner described above. The branch information stored in the branch information buffer 48, comprises in this event the predicted branch destination address and the validity bit V. Although depicted in FIG. 8, the BCT bit and an instruction code length are not stored in the branch history table 46 and are therefore not stored in the branch information buffer 48.

Again in FIG. 1, a first branch information register 51 has an address and a branch information field like the branch information buffer 48. Similarly, each of second and third branch information registers 52 and 53 has an address and a branch information field. The address information field of each of the second and the third branch information registers 52 and 53 is for the instruction code length and the branch instruction address. The branch information field is depicted in FIG. 8 in two parts, one for the BCT bit and the other for the predicted branch destination address and the validity bit V.

It will now be assumed that the current instruction is a branch instruction which may or may not be a branch count instruction BCT. As noted before, the branch instruction will be denoted by BC if different from the branch count instruction BCT. The branch information switch 49 delivers the branch instruction address and the branch information of the branch information buffer 48 to the address and the branch information fields of the first branch information register 51 as a content thereof simultaneously with delivery of each instruction word from the instruction buffer 43 to the instruction decoding circuit 36. Only when the instruction buffer 43 and consequently the branch information buffer 48 is empty, the branch information switch 49 transfers the branch instruction address and the branch information to the first branch information register 51 directly from the instruction address register 41 and the branch history table 46, respectively. It is to be noted in this connection that when the instruction decoding circuit 36 is supplied either directly with the instruction word read out of the instruction memory unit 31 in response to a request address or indirectly through the instruction buffer 43, the first branch information register 51 is supplied with the branch instruction address and the branch information produced by the branch history table 46 in response to the request address in question. The instruction word and the branch instruction address will therefore be referred to afresh as a current instruction and a current instruction address, respectively.

When the current instruction is subjected to the ID stage, the content of the first branch information register 51 is moved to the second branch information register 52. The BCT bit and the instruction code length are delivered from the instruction decoding circuit 36 to the second branch information register 52. The BCT bit, the instruction code length, and the content of the first branch information register 51 are stored in the second information register 52 as a content thereof. Upon subjection of the current instruction to the IT stage, the content of the second branch information register 51 is transferred to the third branch information register 53.

Figure 9:
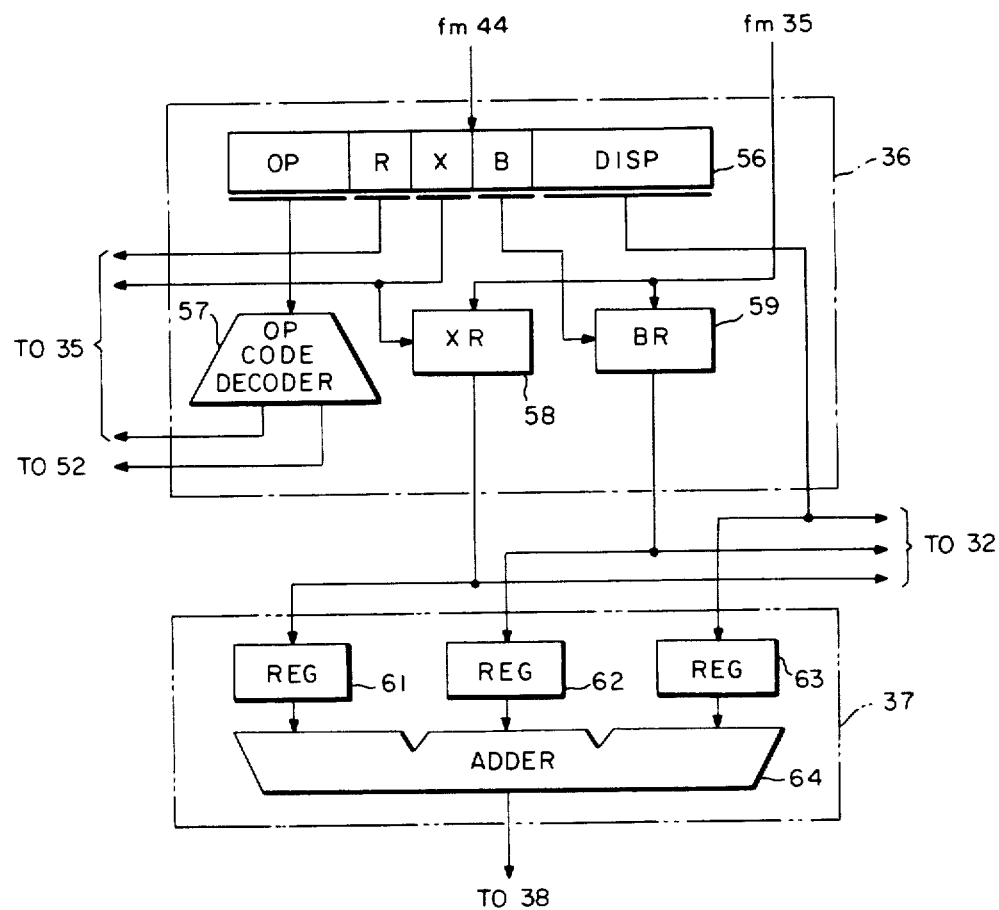
FIG. 9 is a detailed block diagram of a part of the data processing system shown in FIG. 1.

Referring to FIG. 9, the instruction decoding circuit 36 comprises an instruction register 56 in which each instruction is stored by the instruction aligner 44 (FIG. 1). For the time being, the instruction may neither be a branch count instruction nor a branch instruction other than the branch count instruction. In the manner known in the art, the instruction register 56 has operation code (OP), R, X, B, and displacement (DISP) fields. The operation code stored in the operation code field, is decoded by an operation code decoter 57 to indicate operation of the instruction executing circuit 35 through a connection which is not depicted in FIG. 1. The R and the X fields of the instruction are delivered also to the instruction executing circuit 35 through like connections. The BCT bit is produced by the operation code decoder 57 and stored in the second branch information register 52 in the manner described above. The instruction code length is produced also by the operation code decoder 57 and stored in the second branch information register 52. It is possible to understand that the operation code decoter 57 is included in the instruction prefetching device and serves to discriminate between a branch count instruction BCT and a branch instruction other than the branch count instruction BCT.

An index register unit (XR) 58 and a base register unit (BR) 59 are software visible registers in which results of execution of the instruction are stored from the instruction executing circuit 35 through connections not shown in FIG. 1. The index and the base register units 58 and 59 are searched by the X and the B fields.

In FIG. 9, the operand address generating unit 37 is operative when the instruction register 56 is loaded with an instruction which requires an operand. Values searched from the index and the base register units 58 and 59 and the displacement field of the instruction are stored in registers 61, 62, and 63, respectively. An adder 64 is for calculating a sum of outputs of the respective registers 61 through 63 to feed a logical address of the operand to the operand address translating circuit 38.

Referring back to FIG. 1 again, an actual branch information register 65 has an address and a branch information field like the second and the third branch information registers 52 and 53. It will now be assumed that the current instruction delivered to the instruction address generating circuit 32 is a branch instruction indicative of "go" to the branch. The branch instruction may be a branch count instruction unless the branch count instruction indicates that the repeated execution of the loop has already occurred. The instruction address generating circuit 32 delivers a logical branch destination address to the instruction address translating circuit 33, which thereupon supplies a prediction evaluating or confirming circuit 66 and a part of the branch information field of the actual branch information register 65 with an actual branch destination address signal indicative of an actual branch destination address obtained by execution of the current branch instruction. Concurrently, the BCT bit, the instruction code length, the current branch instruction address, and the validity bit V are moved from the third branch information register 53 to another part of the branch information field, the address information field and still another part of the branch information field of the actual branch information register 65.

Executing a branch instruction in compliance with the indication given from the operation code decoder 57 (FIG. 9), the instruction executing circuit 35 produces an actual branch direction signal indicative of an actual branch direction, namely, whether the stream of execution should have been directed to the "no go" to branch side or is actually directed to the "go" to branch side. The instruction executing circuit 35 capable of producing such a branch direction signal, will briefly be described later in the following and may be that described in U.S. Pat. No. 3,825,895 issued to Dee E. Larsen et al and assigned to Amdahl Corporation.

An instruction address adder 67 is fed from the address information field of the actual branch information register 65 with the current branch instruction address and the instruction code length of the current branch instruction to provide a next instruction address for an instruction which next follows the current branch instruction in the instruction sequence. An instruction address selector 69 is controlled by the actual branch direction signal to select the next instruction address and the actual branch destination address as a selected instruction address when the actual branch direction signal indicates the "no go" and the "go" to branch sides, respectively.

The selected instruction address is delivered to the request address selector 42 and stored in a selected destination address register 71 as a selected destination address, which is delivered thence to the request address selector 42 and to the branch history table 46. The current branch instruction address is fed also to the request address selector 42 directly from the actual branch information register 65.

It has already been described in connection with the second and the third branch information registers 52 and 53 that the branch information comprises the BCT bit, the predicted branch destination address, and the validity bit V. The prediction evaluating circuit 66 is supplied also with the actual branch direction signal from the instruction executing circuit 35, the predicted branch destination address and the validity bit V from the third branch information register 53, and the BCT bit from the actual branch information register 65. It is possible to understand that a combination of the actual branch destination address signal of the instruction address translating circuit 33 and the actual branch direction signal of the instruction executing circuit 35 gives a result of actual execution of the current branch instruction which is under execution by the instruction executing unit. It will become clear as the description proceeds that the prediction evaluating circuit 66 evaluates the branch information and the BCT bit in consideration of the result of actual execution and produces a branch evaluation signal BE and a prediction evaluation signal PE.

The branch evaluation signal BE is delivered to the prefetch control unit 47 as another of the three input signals and indicates whether a loop should be repeatedly executed or should be left. For a branch count instruction BCT which generally predicts "go" to the branch with the actual and the predicted branch destination addresses rendered coincident with each other so as to repeatedly execute a loop, the branch evaluation signal BE of the logic one level represents the fact that the actual branch direction signal is produced by the instruction executing unit 35 with the logic zero level to indicate leave of the loop.

The prediction evaluation signal PE is fed to the prefetch control unit 47 as still another of the three input signals and to a write pulse flip-flop 72. The prediction evaluation signal PE indicates, with the logic zero and one levels, the correctness and incorrectness of the prediction, respectively. In other words, the prediction evaluation signal PE of the logic zero and one levels indicates that the predicted branch direction and the predicted branch destination address are correct and incorrect, respectively, in view of the respective ones of the actual branch direction and the actual branch destination address which become evident by the result of actual execution. When indicative of failure or incorrectness of the prediction, the write pulse flip-flop 72 delivers a write pulse to the branch history table 46, holding the prediction evaluation signal PE of the logic one level during one machine cycle.

When selected by the request address selector 42 in the manner which will become clear as the description proceeds, the selected instruction address of the instruction address selector 69 is used for prefetch of an instruction next subsequent to the current branch instruction in the stream of execution. When selected by the request address selector 42, the current branch instruction address is used in accessing the branch history table 46 for renewal or updating of the branch information in response to the write pulse and with reference to the actual branch destination address which is selected by the instruction address selector 69, stored in the selected destination address register 71 as the selected destination address, and delivered to the request address selector 42.

It is generally understood that branch instructions are included only here and there in an instruction sequence. The address hit signal therefore ordinarily indicates absence in the branch history table 46 of the address information which specifies a branch instruction address. Responsive to the address hit signal indicative of the absence, the prefetch control unit 47 makes the request address selector 42 select the next request address supplied from the request address adder 45.

If the address hit signal indicates presence in the branch history table 46 of the address information which specifies the instruction address of a branch instruction, the branch instruction is either a branch count instruction BCT or a branch instruction other than the branch count instruction. Discrimination therebetween is possible by the BCT bit. The branch count instruction BCT may indicate leave of a loop, which fact is indicated by the branch evaluation signal BE.

It will be assumed that the predicted branch direction is coincident with the actual branch direction and that the predicted branch destination address is also coincident with the actual branch destination address. The prefetch control unit 47 is informed of the facts by the prediction evaluation signal PE.

When the branch instruction is not a branch count instruction BCT, the prefetch control unit 47 makes the request address selector 42 select the predicted branch destination address supplied from the branch history table 46. Also when a branch count instruction BCT indicates "go" to the branch, namely, repeated execution of a loop, the prefetch control unit 47 makes the request address selector 42 select the predicted branch destination address supplied from the branch history table 46. Prefetch proceeds to the branch destination instruction on the "go" to branch side at once without waiting for the result of decoding of the branch instruction which may or may not be a branch count instruction BCT.

It will now be assumed that the predicted branch direction is noncoincident with the actual branch direction or that the predicted branch destination address is noncoincident with the actual branch destination address despite coincidence between the predicted and the actual branch directions. The prefetch control unit 47 is informed of either fact by the prediction evaluation signal PE. It is to be noted that the predicted and the actual branch directions are noncoincident with each other when the branch count instruction BCT indicates leave of the loop, namely, "no go" to the branch. A selected destination address is set in the selected destination address register 71 irrespective of the prediction evaluation signal PE.

When the actual branch direction is "no go" to the branch, the instruction address selector 69 selects that next instruction address as the selected instruction address which is calculated by the instruction address adder 67. The prefetch control unit 47 makes the request address selector 42 select the next instruction address for prefetch of the instruction which next follows the current branch instruction in the instruction sequence. If the branch instruction is not a branch count instruction BCT in this event, the prefetch control unit 47 makes the request address selector 42 select one machine cycle later the current branch instruction address which is supplied directly from the actual branch information selector 65. The write pulse resets the validity bit V of the branch information which corresponds in the branch history table 46 to the address information indicative of the branch instruction address under consideration. If the branch instruction is a branch count instruction BCT, the branch history table 46 is left untouched.

When the actual branch direction is towards the "go" to branch side, the instruction address selector 69 selects the actual branch destination address from the actual branch information register 65 as the selected instruction address. If the branch instruction is not a branch count instruction BCT, the prefetch control unit 47 makes the request address selector 42 select one machine cycle later the current branch instruction address of the actual branch information register 65. The write pulse substitutes the actual branch destination address in the branch history table 46 for the existing branch destination address specified by the branch information which corresponds to the address information indicative of the branch instruction address in question. Immediately thereafter, the prefetch proceeds in accordance with the updated branch information. If the branch instruction is a branch count instruction BCT, the prefetch control unit 47 makes the request address selector 42 select the selected instruction address supplied directly from the instruction address selector 69. The prefetch proceeds in accordance with the selected instruction address. The write pulse is, however, not produced to renew the branch history table 46.

Figure 10:
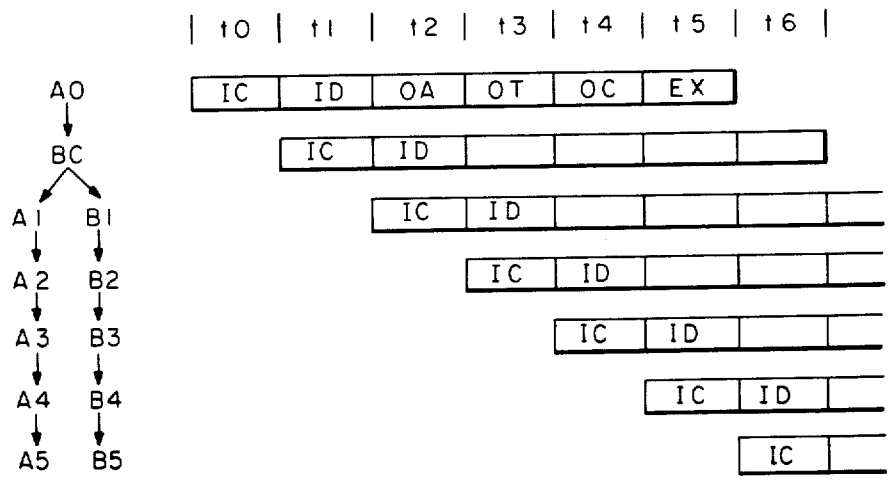
FIG. 10 is a diagram for use in describing operation of the instruction prefetching device depicted in FIG. 1.

Referring to FIG. 10, prefetch of the instruction sequence exemplified in FIGS. 3 and 4 is carried out by the instruction prefetching device described in conjunction with FIG. 1 in a case where correctness of the prediction is indicated to the prefetch control unit 47 by the prediction evaluation signal PE produced by the prediction evaluating circuit 66 for a branch instruction BC which is not a branch count instruction BCT. Attention will now be directed only to the IC and the following stages, assuming that the IC through the EX stages are carried out for the branch condition instruction A0 at the zeroth through the fifth instants t0 to t5, respectively.

At the IC stage carried out for each instruction, the current request address is used as usual in reading the instruction from the instruction memory unit 31. At the same time, the request address is used in retrieving the branch history table 46.

At the first instant t1, the branch instruction BC is read out of the instruction memory unit 31. The branch history table 46 produces the address hit signal and the branch information which specifies a branch destination address as a predicted branch destination address. When the address hit signal indicates "no go" to the branch as the predicted branch direction, the IC stage is carried out at the second, third, and subsequent instants t2, t3, and so forth for the instructions A1, A2, and so on which are on the "no go" to branch side. When the address hit signal indicates "go" to the branch, the IC stage is carried out at the second, third, and following instants t2, t3, and others for the instructions B1 and so forth which are on the "go" to branch side. The EX stage is carried out for the branch condition instruction A0 at the fifth instant t5. Inasmuch as the prediction is correct in the case being described, prefetch proceeds in the predicted branch direction at the sixth instant t6 and after either for the instruction A5 and the like or the instruction B5 and others without any disturbance to the stream of prefetch operation.

Figure 11:
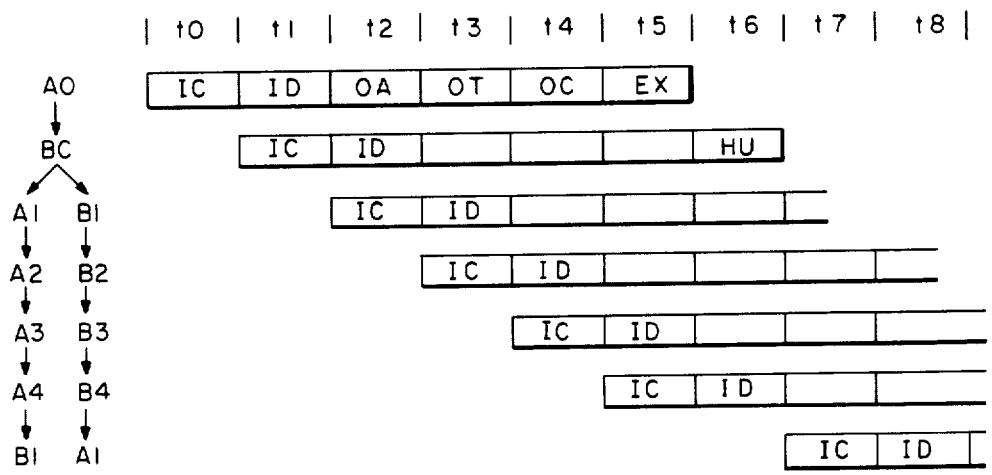
FIG. 11 is a another diagram for use in describing operation of the instruction prefetching device shown in FIG. 1.

Turning to FIG. 11, it will now be assumed that failure of the prediction is indicated by the prediction evaluation signal PE. In the manner described with reference to FIG. 10, prefetch proceeds at the second through the fifth instants t2 to t5 for the instructions A1 through A4 and for the instructions B1 through B4 when the prediction is "no go" and "go" to the branch, respectively. At the fifth instant t5, the prediction is decided to be incorrect as a result of the EX stage carried out for the branch condition instruction A0. At the sixth instant t6, the branch history table 46 is updated or renewed as indicated along the line for the branch instruction BC by HU (history table update). At the seventh instant t7, the IC stage is carried out afresh either for the foremost instruction B1 on the "go" to branch side or for the instruction A1 on the "go" to branch side along a proper stream of instruction execution.

Reviewing FIGS. 10 and 11, the loss cycle is nil if the prediction is correct. The loss cycle is five machine cycles long if the prediction fails. Inasmuch as the prediction is carried out not only for the branch direction but also for the branch destination address, the degree α of correctness of the prediction is somewhat smaller than that for the case of the Smith patent application described with reference to FIG. 4. The decrease is, however, trivial and the degree α may again be about 0.8. The average loss cycle for each branch instruction is:

$$0.\alpha + 5.(1-\alpha) = 1 \text{ (machine cycle)},$$

and is astonishingly reduced.

Figure 12:
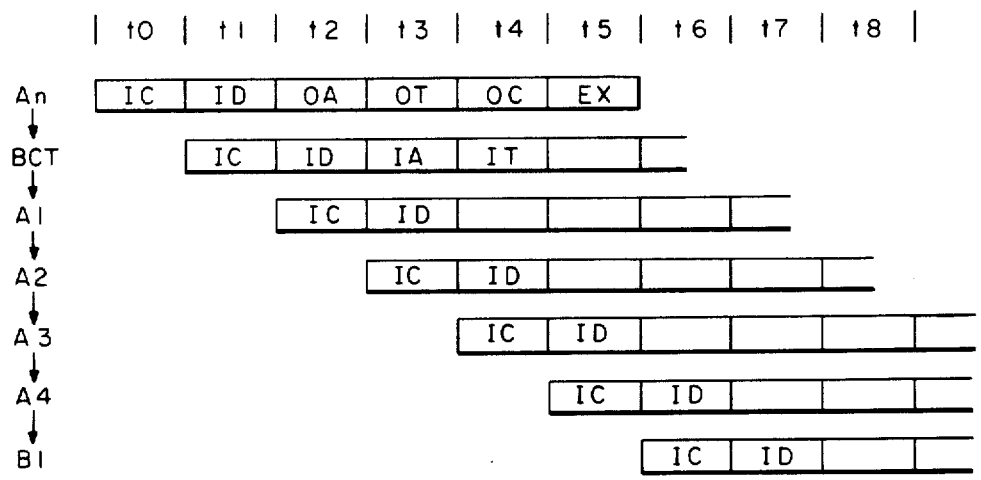
FIG. 12 is still another diagram for use in describing operation of the instruction prefetching device illustrated in FIG. 1.

Further turning to FIG. 12, it will be assumed that the branch instruction is a branch count instruction BCT and that the branch count instruction BCT indicates leave of a loop, namely, the actual branch direction is "no go" to the branch despite the predicted branch direction of "go" to the branch. Even in this event, the branch history table 46 is left untouched at the sixth instant t6. The loss cycle is therefore four machine cycles long despite the fact the the branch evaluation signal BE indicates incorrectness of the predicted branch direction.

Before indication of leave of the loop by the branch count instruction BCT, the loop is executed without a loss cycle by the branch information indicative of "go" to the branch. Unless the branch count instruction BCT is discriminated from other branch instructions, five machine cycles are lost in renewing the branch history table 46 upon leave of the loop. On again entering the loop, five machine cycles are also lost in again renewing the branch history table 46. With the instruction prefetching device being illustrated, the loop is again entered without the loss cycle because the branch history table 46 is not renewed on previously leaving the loop.

Once again in FIG. 1, the request address adder 45 would calculate the sum for the real address. In a data processing system which carries out paging, the next request address may therefore become over or beyond the page being referred to. In this case of the page over, the IT stage must be carried out anew. Under the circumstances, the request address adder 45 should comprise a detector (not shown) for detecting the page over to produce a page over signal upon detection of the page over. The page over signal is delivered to the instruction address generating circuit 32 to again start the process from the IA stage.

Figure 13:
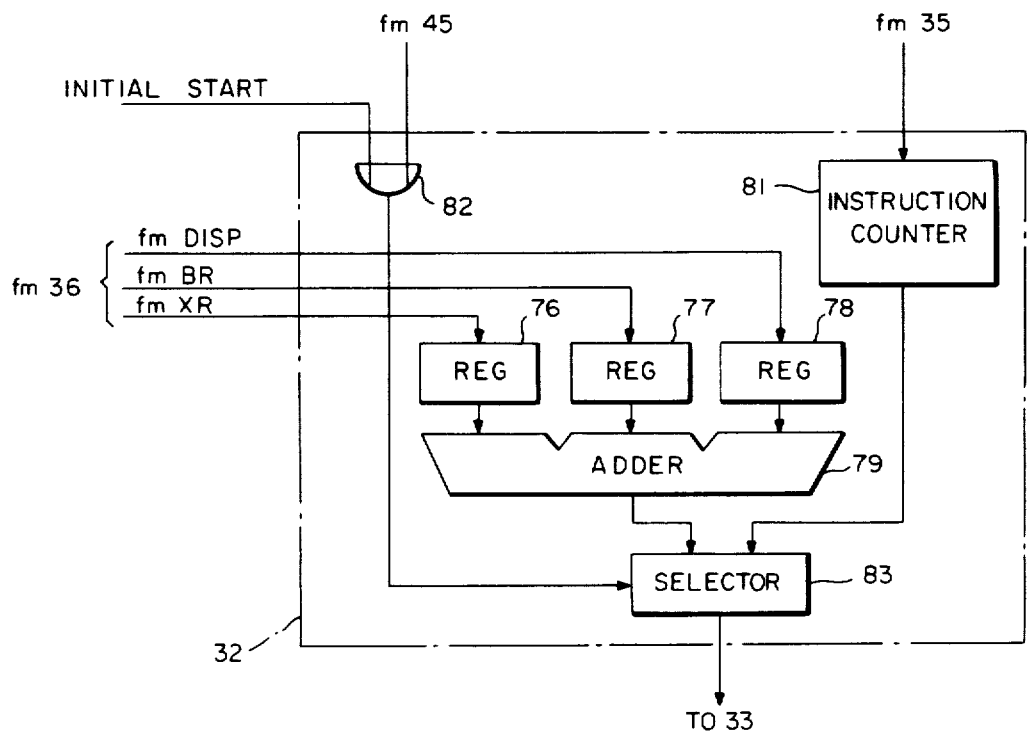
FIG. 13 is a detailed block diagram of another part of the data processing system depicted in FIG. 1.

Turning to FIG. 13, the instruction address generating circuit 32 comprises first through third registers 76, 77, and 78 which are loaded with the values searched from the index and the base register units 58 and 59 (FIG. 9) and with the displacement given from the displacement field of the instruction register 56, respectively. An adder 79 is for calculating a sum of outputs of the respective registers 76 through 78 to produce a logical instruction address. When the branch information is stored in the instruction register 56 as a current branch instruction, the logical instruction address is a logical branch destination address for the current branch instruction. The branch instruction may be a branch count instruction BCT.

An instruction counter 81 is for indicating a next logical address of subsequent instruction which should be executed subsequent to the current instruction. For this purpose, the instruction counter 81 is updated through a connection (not shown in FIG. 1) by a result of execution carried out for the current instruction by the instruction executing circuit 35. An OR circuit 82 is for producing an OR output signal in response to either of the page over signal and an initial start signal supplied from outside of the data processing system being illustrated. Responsive to the OR output signal, a logical address selector 83 selects the next logical address to deliver the same to the instruction address translating circuit 33 for prefetch of the subsequent instruction. Otherwise, the logical address selector 83 supplies the instruction address translating circuit 33 with the logical address calculated by the adder 79.

Figure 14:
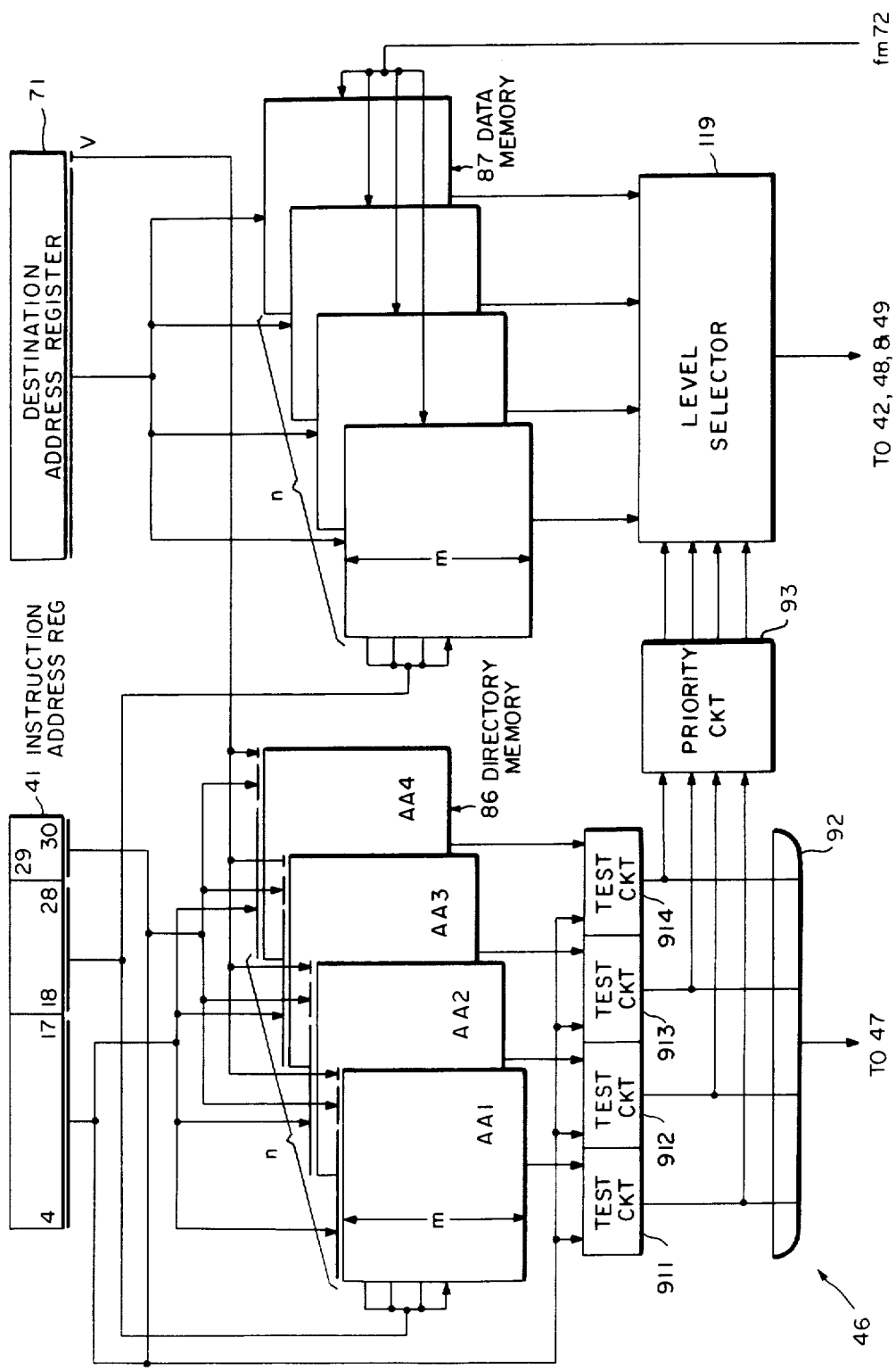
FIG. 14 shows in blocks the branch history table mentioned in conjunction with FIG. 6 together with related circuitry.

Referring now to FIG. 14, the branch history table 46 may comprise a directory memory 86 and a data memory 87. Each memory 86 or 87 is an m-set n-level memory, where each of m and n represents a natural number which is predetermined in the known manner in consideration of the architecture of the data processing system. The directory and the data memories 86 and 87 are for storing the address information AA and the branch information DA, respectively, in the manner illustrated with reference to FIG. 6 and are retrieved by a set address which is given by eighteenth through twenty-eighth bits of the request address IAR(:18-28). The retrieval is carried out in accordance with the set associative method which is known in the art and will briefly be described in the following.

It will be assumed in the following that the levels are four in number as usual. First through fourth levels of the directory memory 86 will be designated by AA1 through AA4. The directory memory levels AAi's (i being representative of one of 1 through 4) are for storing different values of the second part of the real address IAR(:29, 30) for each branch instruction address.

First through fourth test circuits 911, 912, 913, and 914 or 91i's are associated with the first through the fourth directory memory levels AAi's, respectively. Each test circuit 91i is supplied with the first and the second real address parts IAR(:4–17) and IAR(:29, 30) of the current request address IAR and is for testing presence and absence of the current branch instruction address in the associated directory memory level AAi. The test circuit 91i produces an i-th partial hit signal which takes logic one and zero levels in the presence and the absence of the current branch instruction address, respectively. Responsive to the partial hit signal, an OR circuit 92 delivers the above-described address hit signal to the instruction prefetch control unit 47. The partial hit signals produced by the respective test circuits 91i's are delivered to a priority circuit 93 for the purpose which will shortly become clear.

Figure 15:
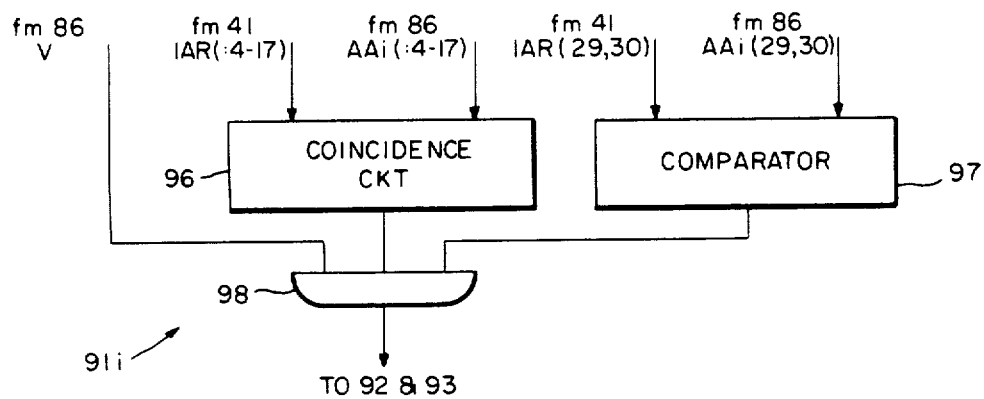
FIG. 15 is a block diagram of a test circuit for use in the branch history table illustrated in FIG. 14.

Turning to FIG. 15, it will be assumed that the validity bit V is stored in the directory memory level AAi. Each test circuit 91i may comprise a coincidence circuit 96 for detecting coincidence and incoincidence between the first real address part IAR(:4–17) of the current request address and a first real address part IAR(:4–17) fed from the associated directory memory level AAi to produce a coincidence signal which takes the logic one and zero levels upon detection of the coincidence and the noncoincidence, respectively. A comparator 97 is for comparing the second real address part IAR(:29, 30) of the current request address with a second real address part IAR(:29, 30) supplied from the associated directory memory level AAi to produce a comparison result signal which takes the logic one and zero levels when the second real address part of the current request address is not less and is less than the second real address part delivered from the associated directory memory level AAi, respectively. The coincidence signal and the comparison result signal are supplied to an AND circuit 98 together with the validity bit V to become the partial hit signal.

The coincidence signal of the logic one level indicates that the associated directory memory level AAi is loaded with an entry which specifies a branch instruction address of a branch instruction comprised by an eight-byte instruction word accessed by the current request address. The logic one coincidence signal is, however, insufficient to establish correspondence between the current request address and a branch instruction which should thereby be prefetched.

Attention will be directed to the instruction word exemplified in FIG. 5. Let the instructions BC0, BC1, and BC2 be branch instructions indicative of "go" to the branch side and the instruction A, an instruction other than branch instructions. If another preceding branch instruction (not shown) indicates the instruction A of an instruction address <A> (labelled in FIG. 5) as a branch destination instruction, a request address set in the instruction address register 41 includes the address <A>. In this event, the instruction which should be prefetched next subsequent to the instruction A in the stream of execution, should not be the branch instruction BC2 but the branch instruction BC1 which next follows the instruction A in the instruction sequence. In FIG. 15, the comparator 97 and the AND circuit 98 are for correctly producing the partial hit signal.

Logic one partial hit signals are, however, produced under the circumstances by the test circuits 91i's which are associated with the directory memory levels AAi's loaded with entries for the branch instructions BC1 and BC2. The priority circuit 93 is for selecting only one partial hit signal for the branch instruction BC1.

Figure 16:
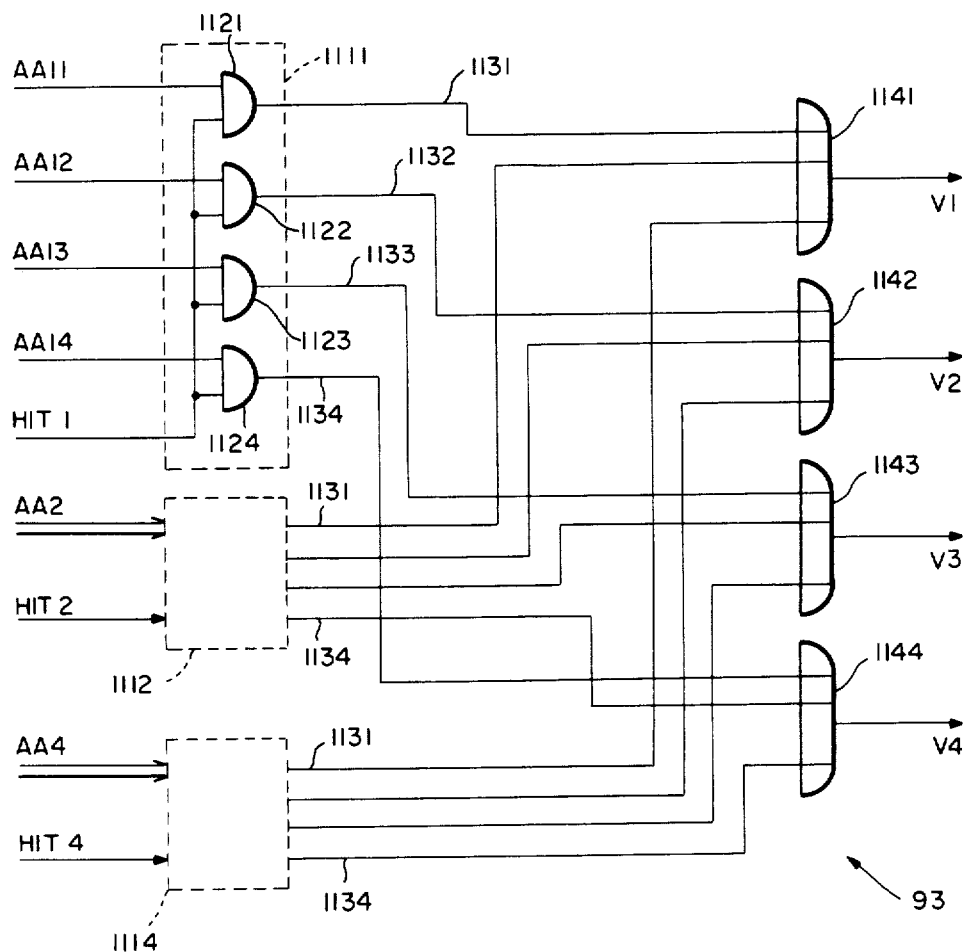
FIG. 16 is a block diagram of a priority circuit for use in the branch history table shown in FIG. 14.

Further turning to FIG. 16, the priority circuit 93 may comprise first through fourth AND circuit groups 1111, 1112, ..., and 1114 or 111i's which receive the partial hit signals from the respective test circuits 91 is and are associated with the respective directory memory levels AAi's through connections not illustrated in FIGS. 14 and 15. In the manner depicted in the first AND circuit group 1111 in detail, each AND circuit group 111i comprises first through fourth AND circuits 1121, 1122, 1123, and 1124 or 112j's supplied in common with the pertinent one of the partial hit signals which are now designated by HIT1 through HIT4 for the test circuits 911 through 914, respectively. As indicated by AAi1 through AAi4, the AND circits 112j's are supplied with the second real address part IAR(:29, 30) which is produced by the associated directory memory level AAi and indicates 0 through 3, respectively. The first through the fourth AND circuits 112j's produce first through fourth AND outputs 1131, 1132, 1133, and 1134 or 113j's which take the logic one level according to (HITi.AAij)'s. Otherwise, the AND outputs 113j have the logic zero level.

The first through fourth AND outputs 113j's of each AND circuit group 111i are delivered to first through fourth four-input OR circuits 1141, 1142, 1143, and 1144 or 114j's, respectively. The OR circuits 114j's produce first through fourth selection signals V1, V2, V3, and V4, respectively. The first selection signal V1 takes the logic one level when at least one of the first AND outputs 1131's of the respective AND circuit groups 111i's is of the logic one level. The second selection signal V2 takes the logic one level when the first selection signal V1 does not take the logic one level and when at least one of the second AND outputs 1132's of the respective AND circuit groups 111i's takes the logic one level. The third selection signal V3 takes the logic one level when one of the first and the second selection signals V1 and V2 takes the logic one level and when at least one of the third AND outputs 1133's of the respective AND circuit groups 111i's is of the logic one level. The fourth selection signal V4 takes the logic one level when none of the first through the third selection signals V1 to V3 is of the logic one level and when at least one of the fourth AND outputs 1134's of the respective AND circuit groups 111i's takes the logic one level.

Otherwise, the selection signals V1 through V4 have the logic one level.

Turning back to FIG. 14, the branch history table 46 comprises a level selector 119 connected to the levels of the data memory 87 and supplied with the first through the fourth selection signals V1 to V4 from the priority circuit 93. In the example described with reference to FIGS. 5 and 14, two of the data memory levels produce the branch information which specifies the branch destination addresses of the branch instructions BC1 and BC2. The selection signal of the logic one level selects the branch information for the pertinent branch instruction BC1 alone. It is thereby possible to establish the correspondence between the branch information produced by the branch history table 46 and the current instruction produced in response to the current request address.

Reviewing FIGS. 14 through 16, the branch history table 46 is retrieved at first by the set address given by the current request address. If it happens that a plurality of branch instruction addresses are specified by the address information stored in one of the sets accessed by the set address, the priority circuit 93 is used to pick up one of the branch instruction adddresses as a picked-up instruction address that is for a branch instruction, such as BC1, which should be prefetched next subsequent to the current instruction. The level selector 119 selects the branch information which comprises the branch destination address obtained by prior execution of the branch instruction in question and therefore corresponds to the picked-up instruction address. It will now be appreciated that the prefetch accurately and rapidly proceeds even in the presence of a plurality of branch instructions in a block of an instruction word.

Figure 17:
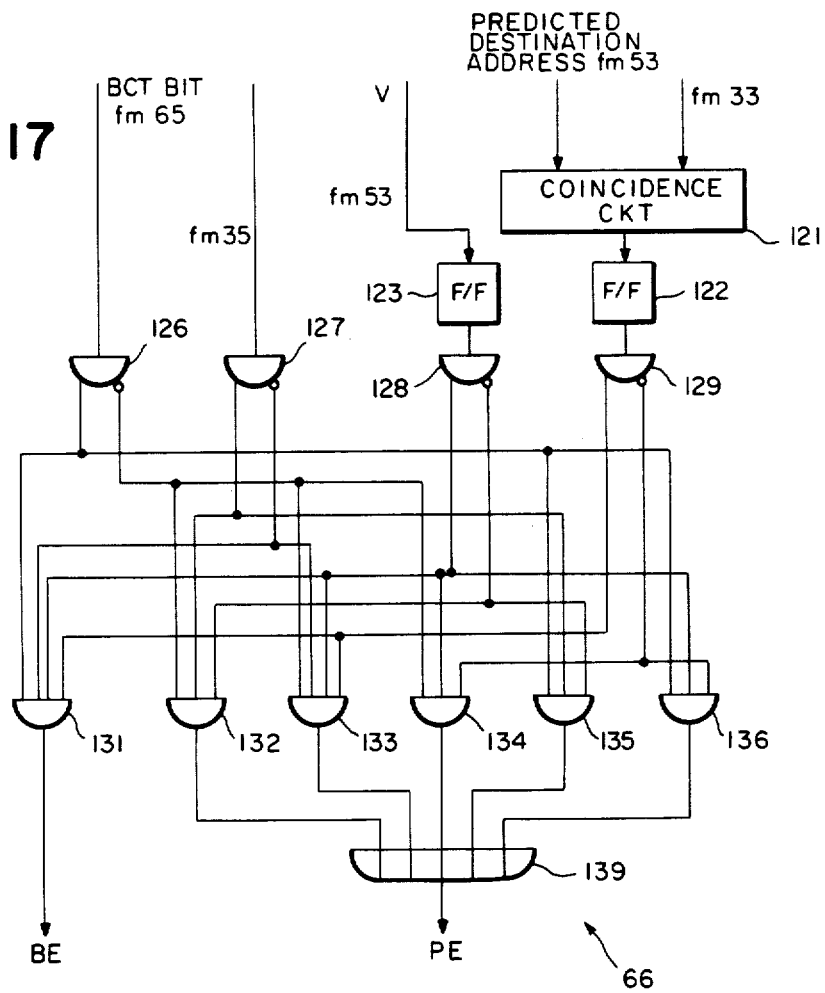
FIG. 17 is a block diagram of a prediction evaluating circuit for use in the instruction prefetching device depicted in FIG. 1.

Referring to FIG. 17, the prediction evaluating circuit 66 may comprise a coincidence circuit 121 for detecting coincidence and noncoincidence between the actual branch destination address supplied from the instruction address translating circuit 33 and the predicted branch destination address fed from the branch information field of the third branch information register 53. The coincidence circuit 121 supplies a flip-flop 122 with coincidence signal which takes the logic one and zero levels upon detection of the coincidence and the noncoincidence, respectively. Another flip-flop 123 is supplied with the validity bit V from the branch information field of the third branch information register 53. Each of the flip-flops 122 and 123 is for holding an input signal supplied thereto during one machine cycle to produce an output signal when a result of actual execution is obtained by the instruction executing circuit 35 for a current instruction for which the predicted and the actual branch destination addresses are delivered to the prediction evaluating circuit 66 together with the validity bit V.

A BCT bit true-false (single-input AND/NAND) circuit 126 is supplied with the BCT bit from the actual branch information register 65 to which the BCT bit is moved from the second branch information register 52 through the third branch information register 53 concurrently with production of the result of actual execution. The BCT bit true-false circuit 126 produces an inverted BCT bit and the BCT bit as it stands. An actual branch direction true-false circuit 127 is supplied with the actual branch direction signal from the instruction executing circuit 35. The actual branch direction signal and an inverted actual branch direction signal are produced by the actual branch direction true-false circuit 127. A validity bit true-false circuit 128 is supplied with the validity bit V from the flip-flop 123. The validity bit true-false circuit 128 produces the validity bit V and an inverted validity bit V̄. A coincidence true-false circuit 129 is supplied with the coincidence signal from the flip-flop 122. The coincidence true-false circuit 129 produces the coincidenece signal and an inverted coincidence signal.

The BCT bit takes the logic one and zero levels for a branch count instruction BCT and an instruction other than a branch count instruction, respectively. The instruction other than a branch count instruction BCT may now be referred to as a general instruction and may be a branch instruction which is not a branch count instruction BCT and may now be called a general branch instruction. The inverted BCT bit takes the logic one and zero levels for a general instruction and a branch count instruction BCT, respectively. The inverted actual branch direction signal has the logic one and zero levels when the actual branch direction is towards the "no go" and the "go" to branch sides, respectively. The inverted actual branch direction signal therefore has the logic one and zero levels when the branch count instruction BCT indicates leave of a loop and repeated execution of the loop, respectively. The inverted validity bit is of the logic one and zero levels when the predicted branch direction is towards the "no go" and the "go" to branch sides, respectively. The inverted coincidence signal is equivalent to the coincidence signal indicative of the noncoincidence and is of the logic one and zero levels when the predicted branch destination address is noncoincident and coincident with the actual branch destination address, respectively.

A first AND circuit 131 is for producing the branch evaluation signal BE in response to the BCT bit delivered from the BCT bit true-false circuit 126, the inverted actual branch direction signal, the validity bit supplied from the validity bit true-false circuit 128, and the coincidence signal delivered from the coincidence true-false circuit 129. The branch evaluation signal BE therefore has the logic one level when a branch count instruction BCT indicates leave of a loop, namely, when the actual and the predicted branch directions become noncoincident and moreover when the actual and the predicted branch direction addresses are coincident with each other. In other cases, the branch evaluation signal BE has the logic zero level.

A second AND circuit 132 is for producing a "no go" prediction failure signal in response to the inverted BCT bit, the actual branch direction signal supplied from the actual branch direction true-false circuit 127, and the inverted validity bit. The "no go" prediction failure signal takes the logic one level for a general branch instruction when the predicted branch direction is "no go" to the branch and furthermore when the actual branch direction is "go" to the branch. Otherwise, the "no go" prediction failure signal takes the logic zero level. A third AND circuit 133 is for producing a "go" failure signal in response to the inverted BCT bit, the inverted actual branch direction signal, the validity bit supplied from the validity bit true-false circuit 128, and the coincidence signal fed from the coincidence true-false circuit 129. The "go" failure signal has the logic one level for a general branch instruction when the predicted branch direction is "go" to the branch and furthermore when the actual branch direction is "no go" to the branch despite the fact that the predicted branch destination address is coincident with the actual branch destination address. Otherwise, the "go" prediction failure signal has the logic zero level. A fourth AND circuit 134 is for producing a predicted branch destination address failure signal in response to the inverted BCT bit, the validity bit supplied from the validity bit true-false circuit 128, and the inverted coincidence signal. The address failure signal is of the logic one level for a general branch instruction when the predicted branch direction is "go" to the branch and furthermore when the predicted branch destination address is noncoincident with the actual branch destination address. Otherwise, the address failure signal is of the logic zero level.

A fifth AND circuit 135 is similar to the second AND circuit 132 except that the BCT bit is supplied from the BCT bit true-false circuit 126 instead of the inverted BCT bit. The fifth AND circuit 135 therefore produces a "no go" prediction failure signal for a branch count instruction BCT. A sixth AND circuit 136 is like the fourth AND circuit 134 and produces a predicted branch destination address failure signal for a branch count instruction BCT. It will now be seen that the first AND circuit 131 corresponds to the third AND circuit 133 and that the branch evaluation signal BE is a "go" faiure signal for a branch count instruction BCT.

A five-input OR circuit 139 is for producing the prediction evaluation signal PE in response to the "no go" prediction failure signal, the "go" failure signal, and the predicted branch destination address failure signal for each general branch instruction and to the "no go" and the address failure signals for a branch count instruction BCT. The prediction evaluation signal PE therefore takes the logic one level either when prediction fails for a general branch instruction or when prediction fails for a branch count instruction BCT indicative of repeated execution of a loop. It is possible to understand that the branch evaluation signal BE has the logic one level when the branch count instruction BE indicates leave of a loop.

Figure 18:
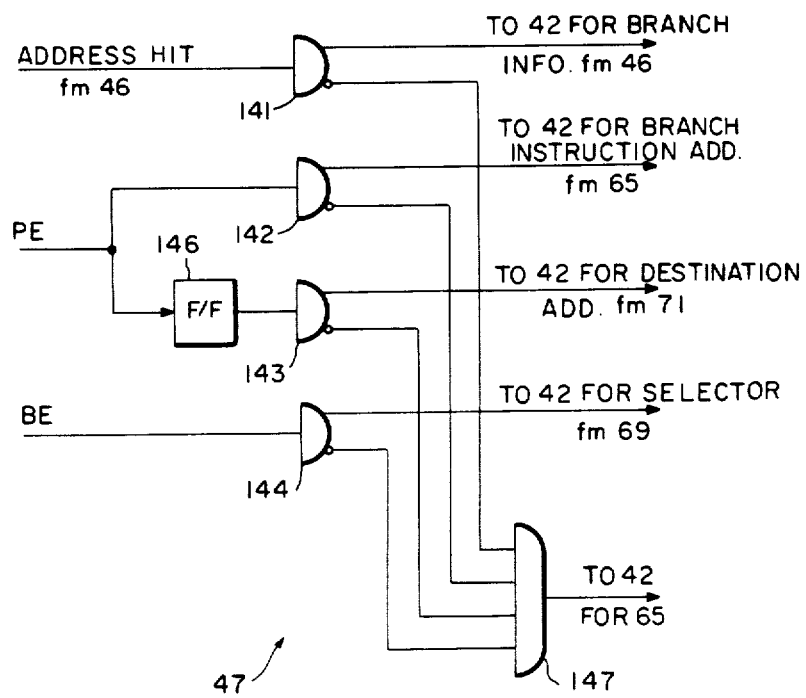
FIG. 18 is a block diagram of an instruction prefetch control unit for use in the instruction prefetching device shown in FIG. 1.

Turning to FIG. 18, the instruction prefetch control unit 47 may comprise first through fourth true-false circuits 141, 142, 143, and 144. A flip-flop 146 is for holding the prediction evaluation signal PE for one machine cycle to produce a delayed prediction evaluation signal substantially simultaneously with production of the write pulse by the write pulse flip-flop 72 (FIG. 1). The first true-false circuit 141 is supplied with the address hit signal from the branch history table 46 to deliver the address hit signal to the request address selector 42 as a first selection signal. The second true-false circuit 142 is supplied with the prediction evaluation signal PE directly from the prediction evaluating circuit 66 to deliver the prediction evaluation signal PE to the request address selector 42 as a second selection signal. The third true-false circuit 143 is supplied with the delayed prediction evaluation signal to deliver the delayed prediction evaluation signal to the request address selector 42 as a third selection signal. The fourth true-false circuit 144 is supplied with the branch evaluation signal BE from the prediction evaluating circuit 66 to deliver the branch evaluation signal BE to the request address selector 42 as a fourth selection signal. An inverted address hit signal, inverted prediction evaluation signals with and without the delay, and an inverted branch evaluation signal are delivered from the first through the fourth true-false circuits 141 to 144, respectively, to a four-input AND circuit 147, which feeds a fifth selection signal to the request address selector 42.

When the address hit signal has the logic one level, the first selection signal takes the logic one level to make the request address selector 42 select the predicted branch destination address supplied from the branch history table 46. When the prediction evaluation signal PE turns to the logic one level, the second selection signal is given the logic one level to make the request address selector 42 select the current branch instruction address which is fed directly from the address information field of the actual branch information register 65. During one machine cycle which next follows turning of the prediction evaluation signal PE to the logic one level, the third selection signal is turned to the logic one level to make the request address selector 42 select the selected destination address which is held in the selected destination address register 71 and fed therefrom. When the branch evaluation signal BE is switched to the logic one level, the fourth selection signal is made to have the logic one level to make the request address selector 42 select the selected instruction address which is delivered directly from the instruction address selector 69.

Whenever the address hit signal takes the logic one level, the AND circuit 147 is supplied from the first true-false circuit 141 with its output turned to the logic zero level. The fifth selection signal is switched to the logic zero level. As soon as the prediction evaluation signal PE is turned to the logic one level, the AND circuit 147 is supplied from the second true-false circuit 142 with its output given the logic zero level. One machine cycle immediately thereafter, the AND circuit 147 is supplied from the third true-false circuit 143 with its output given the logic zero level. When the branch evaluation signal BE is turned to the logic one level, the AND circuit 147 is supplied from the fourth true-false circuit 144 with its output given the logic zero level. The fifth selection signal therefore has the logic one level when the address hit signal is of the logic zero level except for one machine cycle immediately following turning of the branch evaluation signal BE to the logic one level and for two machine cycles immediately following turning of the prediction evaluation signal PE to the logic one level. The fifth selection signal of the logic one level is used in making the request address selector 42 select the next instruction address which is fed from the request address adder 45.

Figure 19:
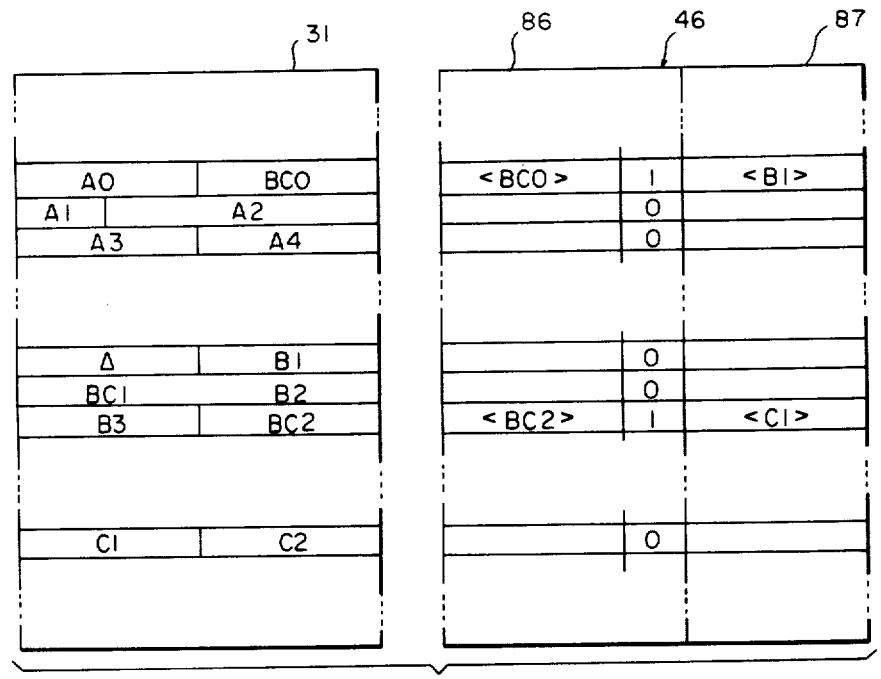
FIG. 19 is a diagram representative of correspondence between an instruction memory unit used in the data processing system shown in FIG. 1 and the branch history table of the type mentioned in connection with FIGS. 6 and 14.

Referring now to FIG. 19, the instruction memory unit 31 is for eight-byte instruction words. Consideration will be given hereunder to an instruction sequence which comprises instructions A0, BC0, A1, A2, A3, A4, . . . , B1, BC1, B2, B3, BC2, . . . C1, C2, and others in succession. The instructions BCk (k being representative of zero and natural numbers) are branch instructions. The instruction A0 may or may not be a branch condition instruction.

In correspondence to the instruction sequence stored in the instruction memory unit 31, the directory memory 86 stores the address information which specifies the instruction addresses <BC0> and <BC2> of the branch instructions BC0 and BC2 indicative of "go" to the branch according to prior results of actual execution. The directory memory 86 furthermore stores, in accordance with prior results of actual execution, logic one validity bits indicative of "go" to the branch in correspondence to the branch instructions BC0 and BC2 and a logic zero validity bit indicative of "no go" to the branch in correspondence to the branch instruction BC1. The validity bits of the remaining branch information are rendered logic zero. The data memory 87 stores, for the branch instructions BC0 and BC2, the branch destination addresses <B1> and <C1> in compliance with prior results of actual execution of the branch instructions BC0 and BC2, respectively. If the branch instruction BC0 does not indicate "go" to the branch despite the predicted branch direction, the instruction A1 should be prefetched next subsequent to the branch instruction BC0. When the branch instruction BC1 actually indicates the predicted branch direction of "no go" to the branch, the instruction B1 should be prefetched next following the branch instruction BC1.

Figure 20:
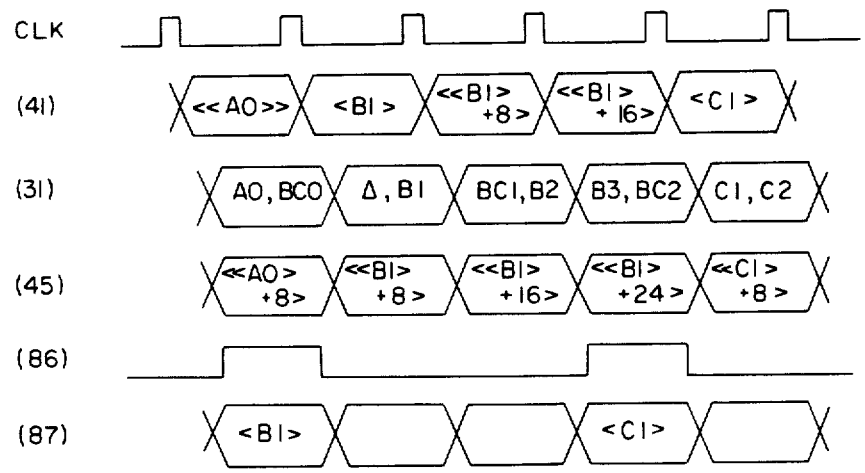
FIG. 20 is a schematic diagram for use in describing operation of the instruction prefetching device comprising the branch history table of the type shown in FIG. 19.

Turning to FIG. 20, a clock pulse sequence CLK is depicted at the top in place of the instants shown in FIGS. 3, 4, and 10 through 12. Operation of the instruction address register 41, the instruction memory unit 31, the request address adder 45, and the directory and the data memories 86 and 87 described in conjunction with FIG. 19, is schematically illustrated along lines labelled (41), (31), (45), (86), and (87), respectively.

On prefetching the instruction sequence under consideration, a boundary address <<A0>> is stored in the instruction address register 41 for the eight-byte instruction word which includes the instruction A0 as a foremost instruction. The instruction word (A0, BC0) is read out of the instruction memory unit 31. In the meantime, the request address adder 45 produces the next request address <<A0>+8>. Simultaneously with read out of the instruction word (A0, BC0), the branch history table 46 is retrieved. Inasmuch as the address information specifying the branch instruction address <BC0> is stored in the directory memory 86, the address hit signal is delivered to the instruction prefetch control unit 47 with the logic one level. Furthermore, the branch information which comprises the branch destination address <B1>, is delivered to the request address selector 42. The prefetch control unit 47 makes the request address selector 42 set the branch destination address <B1> in the instruction address register 41 in the manner depicted along the line (41). Incidentally, the branch destination address <B1> is delivered also towards the first branch information register 51 together with the validity bit V.

Responsive to the branch destination address <B1> set in the instruction address register 41, the instruction memory unit 31 produces the instruction word (Δ, B1). Meanwhile, the request address adder 45 produces the next request address <<B1>+8>. The branch history table 46 is retrieved by the request address set in the instruction address register 41. Inasmuch as the directory memory 86 is loaded with the validity bit V of the logic zero level, the address hit signal is switched to the logic zero level. Prefetch proceeds along the "no go" to branch side by the use of successively calculated request addresses until the validity bit V of the logic one level is found in the branch history table 46 by retrieval with the request address for the instruction word (B3, BC2).

The instruction words are thus read out of the instruction memory unit 31 and accumulated in the instruction buffer 43 as a queue in the order in which the prefetched instructions should be executed. Incidentally, it is possible to continue prefetch of the instructions on the "no go" to branch side for a short while even upon production of the address hit signal of the logic one level and to thereafter prefetch the instructions in the predicted branch direction.

Figure 21:
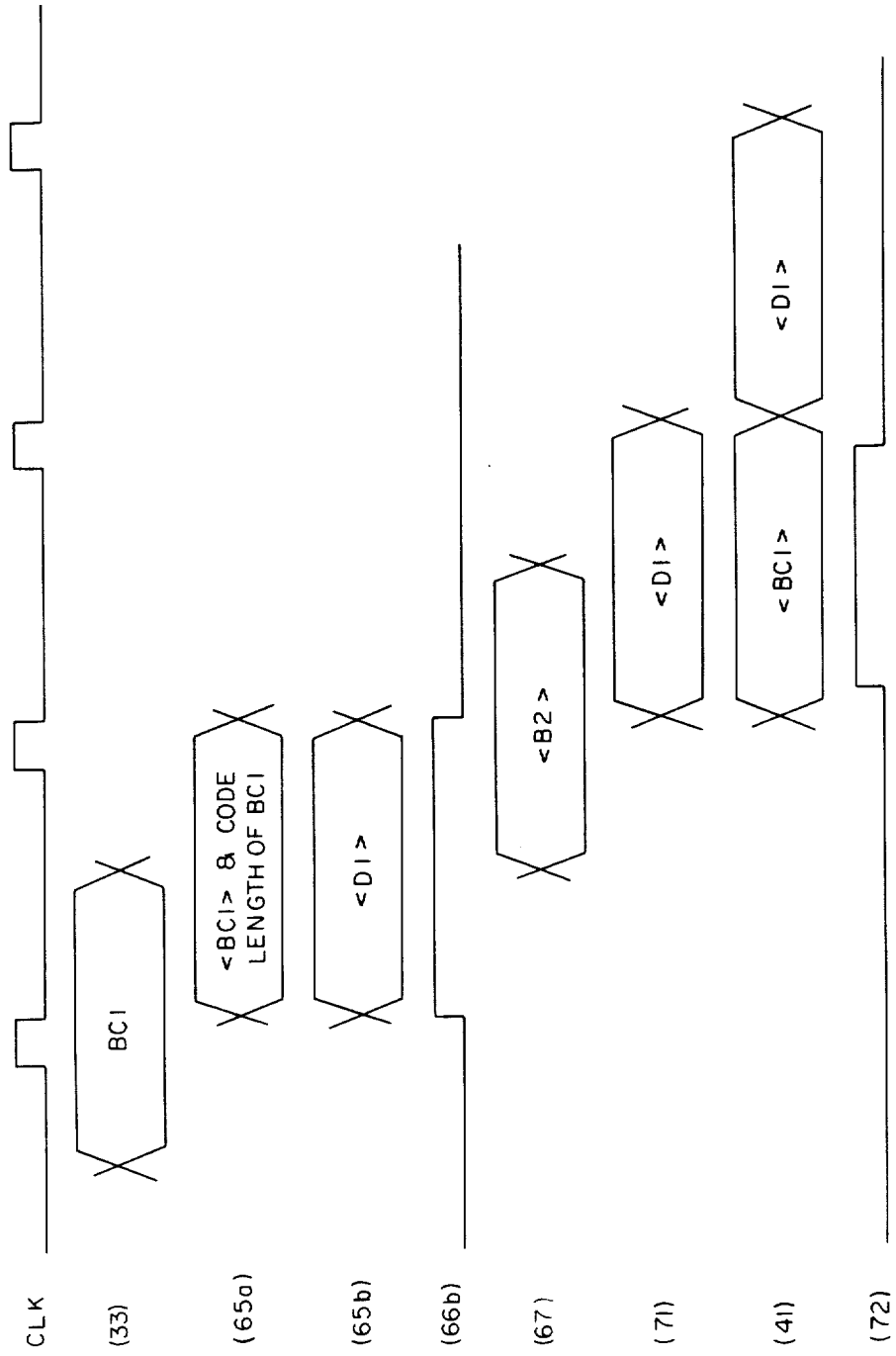
FIG. 21 is another schematic diagram for use in describing operation of the instruction prefetching device mentioned in conjunction with FIG. 20.

Further turning to FIG. 21, operation of the instruction address translating circuit 33, the address and the branch information fields of the actual branch information register 65, the prediction evaluating circuit 66 for prediction evaluation signal PE, the instruction address adder 67, the selected destination address register 71, the instruction address register 41, and the write pulse flip-flop 72, is schematically illustrated along lines labelled (33), (65a), (65b), (66p), (67), (71), (41), and (72), respectively. The instruction sequence of FIG. 19 will be referred to.

It will now be assumed that the address translation is carried out by the address translating circuit 33 for the branch instruction BC1. The predicted branch direction is to the "no go" to branch side as has so far been assumed. Let an actual branch destination address <D1> of a new branch destination instruction D1 (not shown in FIG. 19) be obtained as a branch destination address on the "go" to branch side as a result of the instruction address translation.

Irrespective of the predicted and the actual branch directions and destination addresses, the address information field of the actual branch information register 65 is loaded with the current branch instruction address <BC1> and the instruction code length of the branch instruction BC1 in the manner depicted along the line labelled (65a). The branch information field is now loaded with the actual branch destination address <D1> together with the logic one validity bit in the manner shown along the line (65b). The BCT bit is not taken into consideration because the branch instruction BC1 is not a branch count instruction BCT. The instruction executing circuit 35 makes the actual branch direction signal indicate "go" to the branch. Inasmuch as the "no go" to branch side is indicated by the validity bit V supplied from the third branch information register 53, the prediction evaluating circuit 66 produces the prediction evaluation signal PE of the logic one level which indicates that the predicted branch direction is incorrect. Irrespective of the prediction evaluation signal PE, the instruction address adder 67 produces the next instruction address <B2> as the branch destination address on the "no go" to branch side.

Rather than the branch destination address on the "no go" to branch side, the actual branch destination address <D1> is selected by the instruction address selector 69 and stored in the selected destination address register 71 as the selected destination address together with the logic one validity bit. Responsive to the logic one prediction evaluation signal, the second selection signal (FIG. 18) makes the request address selector 42 set the current branch instruction address <BC1> in the instruction address register 41 in preparation for renewal of the branch history table 46. When the write pulse flip-flop 72 delivers a write pulse to the branch history table 46, the branch information for the current branch instruction address <BC1> held in the instruction address register 41, is renewed in the branch history table 46 by the selected branch destination address held in the selected destination address register 71 together with the logic one validity bit. At the substantially same time, the third selection signal moves the selected destination address from the selected destination address register 71 to the instruction address register 41. The prefetch proceeds to the instruction D1.

In connection with FIGS. 20 and 21, the branch instruction BC0 will again be taken into consideration. In the manner described for the branch instruction BC1 in conjunction with FIG. 21, the instruction address adder 67 calculates the next instruction address <A1> (FIG. 19) as the branch destination address on the "no go" to branch side.

If the actual branch direction signal indicates "no go" to the branch, the next instruction address <A1> is selected by the instruction address selector 69 and stored in the selected destination address register 71 as a selected destination address together with a logic zero validity bit. Prior thereto, the prediction evaluation signal PE is switched to the logic one level. Upon production of the second selection signal, the current branch instruction address <BC0> is set in the instruction address register 41. With reference to the logic zero validity bit stored in the selected destination address register 71, the write pulse cancels the branch destination address <B1> hitherto stored in the data memory 87 for the branch instruction BC0. In addition, the validity bit V is reset. The third selection signal moves the next instruction address <A1> from the selected destination address register 71 to the instruction address register 41. The prefetch proceeds to the instruction A1.

From the description thus far made in connection with renewal of the branch history table 46, it will now be understood that it is possible to use various algorithms for renewing the branch history table 46 with regards to the branch destination address and the validity bit V. Depending on the algorithms, the renewal may statistically be carried out by keeping the results of actual execution of each branch instruction until completion of the instruction sequence being dealt with.

When a new entry pair of first and second entries should be stored afresh in the branch history table 46, a problem may arise with regard to the sets in which the new entry pair should be substituted for an existing entry pair. It is desirable in this event to resort to the least recent use (LRU) scheme, according to which the sets are selected where the existing entry pair was used oldest among the existing entry pairs. Alternatively, the first-in-first-out (FIFO) scheme may be resorted to. The scheme is to select the sets where the existing entry pair was stored earliest of the existing entry pairs.

Figure 22:
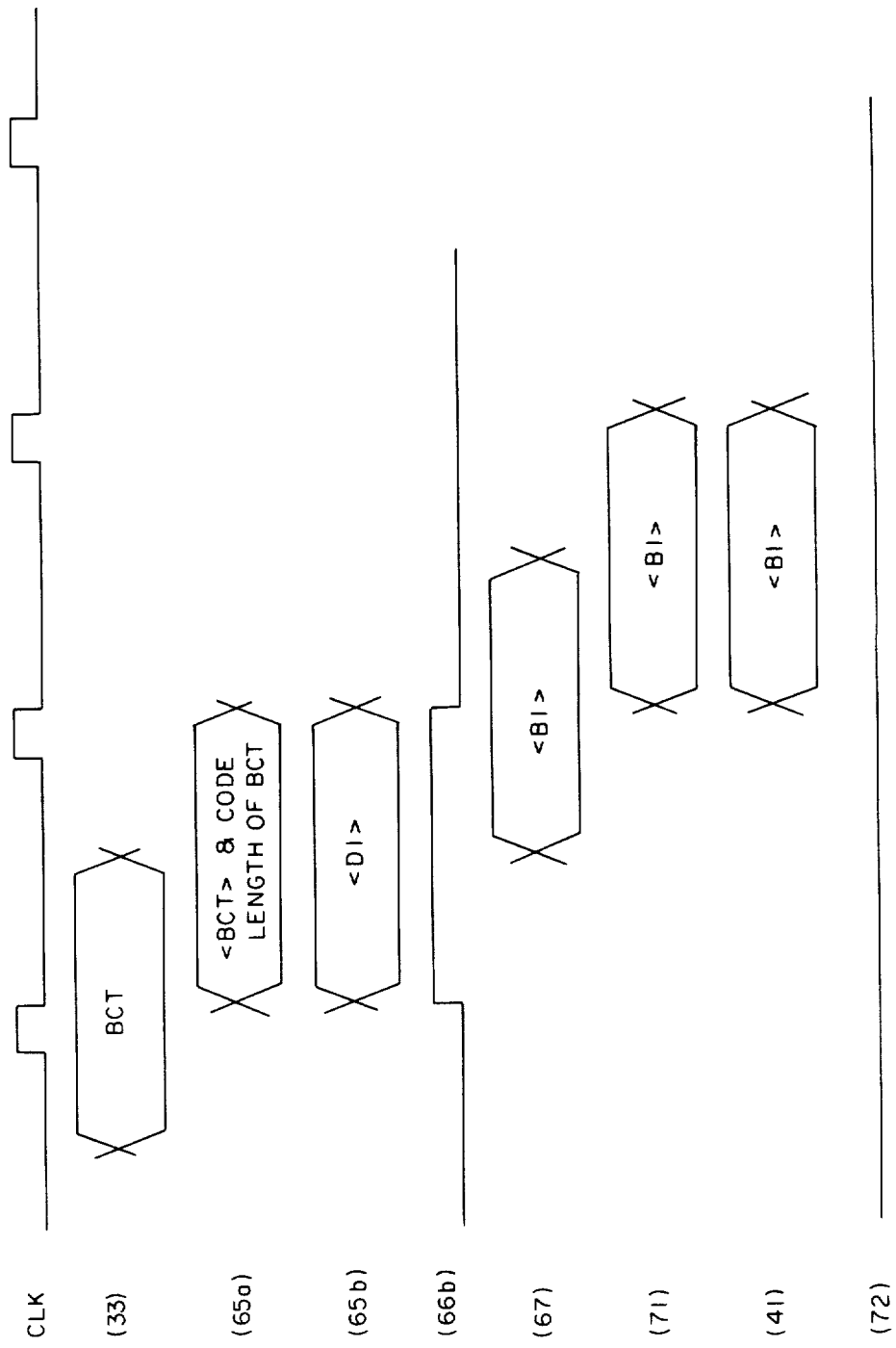
FIG. 22 is still another schematic diagram for use in describing operation of the instruction prefetching device mentioned in connection with FIG. 20.

Referring to FIG. 22, operation of the instruction address translating circuit 33, the address and the branch information fields of the actual branch information register 65, the prediction evaluating circuit 66 for the branch evaluation signal BE, the instruction address adder 67, the selected destination address register 71, the instruction address register 41, and the write pulse flip-flop 72, in schematically illustrated along lines labelled (33), (65a), (65b), (66b), (67), (71), (41), and (72). Attention is now directed to a branch count instruction BCT which is exemplified in FIG. 7 and has the instruction A1 on the "go" to branch side, namely, foremost in a loop, and the instruction B1 on the "no go" to branch side, namely, as an instruction which stands foremost when the loop is left.

It will now be assumed that the branch count instruction BCT indicates leave of the loop. Nearly one machine cycle after the instruction address translation carried out by the instruction address translating circuit 33 for the branch count instruction BCT, the address information field of the actual branch information register 65 is loaded with a current branch instruction address <BCT> and an instruction code length of the branch count instruction BCT. The branch information field of the actual branch information register 65 is loaded with an actual branch destination address <A1> of the instruction A1 on the "go" to branch side because the validity bit V is kept at the logic one level for each branch count instruction. The prediction evaluating circuit 66 produces the branch evaluation signal BE with the logic one level in this case of leaving the loop. Meanwhile, the instruction address adder 67 calculates an instruction address <B1> for the instruction B1 on the "no go" to branch side.

Inasmuch as the actual branch direction is "no go" to the branch, the actual branch direction signal makes the instruction address selector 69 select the instruction address <B1>, which is stored in the selected destination address register 71 and delivered directly to the request address selector 42. The fourth selection signal (FIG. 18) makes the request address selector 42 store the instruction address <B1> in the instruction address register 41. Inasmuch as the prediction evaluation signal PE is kept at the logic zero level, the write pulse flip-flop 72 produces no write pulse. The branch history table 46 is kept as it stands. The prefetch proceeds with the remainder of the loop.

Figure 23:
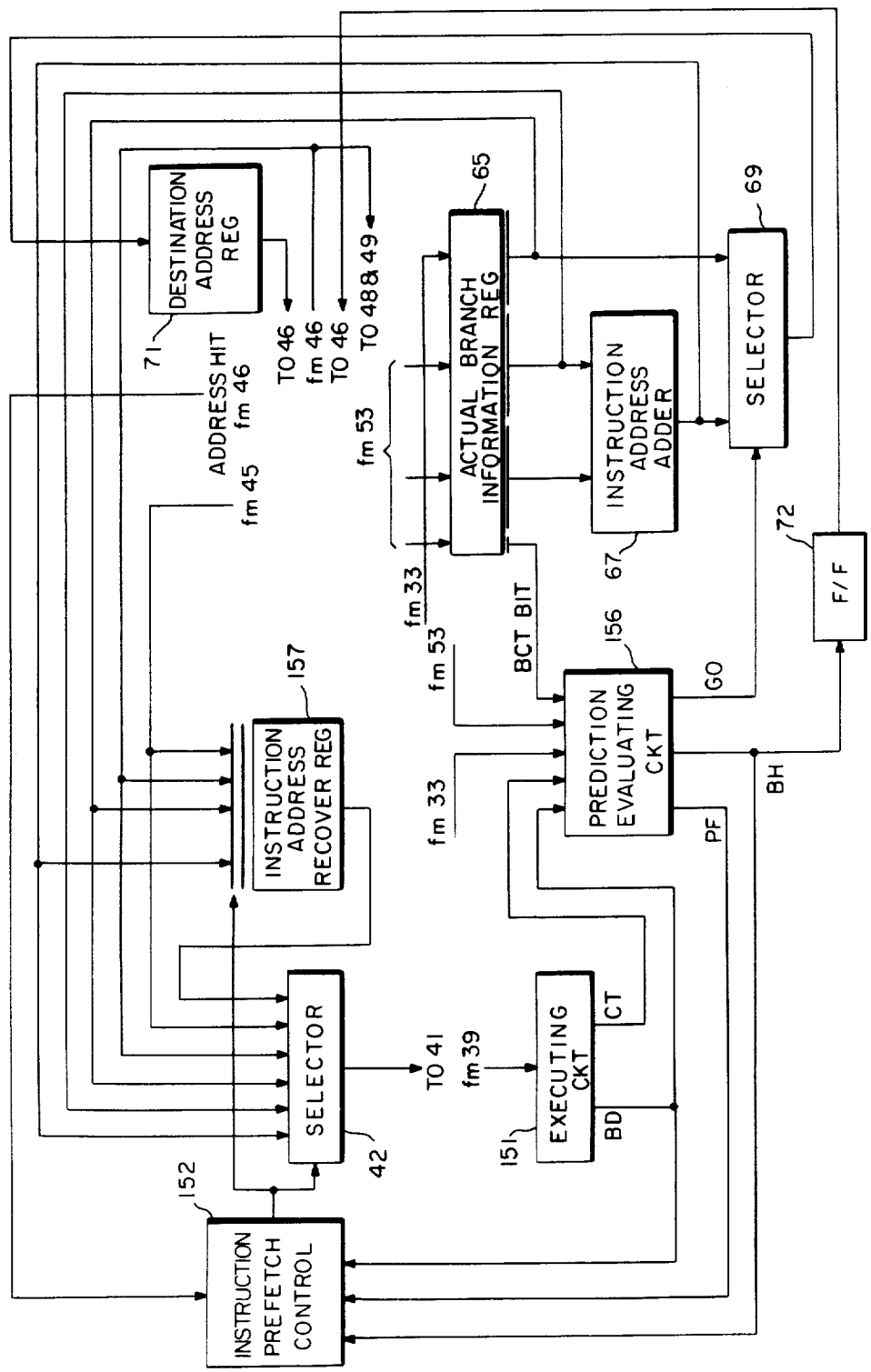
FIG. 23 is a partial block diagram of a data processing system which comprises an instruction prefetching device according to a second embodiment of this invention.

Referring now to FIG. 23, a data processing system comprises an instruction prefetching device according to a second embodiment of this invention. The data processing system and the instruction prefetching device comprise similar parts designated by like reference numerals except the following.

An instruction executing circuit 151 and an instruction prefetch control unit 152 are substituted for the corresponding circuit and unit 35 and 47 described heretobefore. It will become clear as the description proceeds that the instruction executing circuit 151 produces a count 1 signal CT besides the actual branch direction signal which is now indicated at BD.

A prediction evaluating or confirming circuit 156 is used in place of the corresponding circuit 66 described above and is supplementarily supplied with the count 1 signal CT. The prediction evaluating circuit 156 produces a prediction failure signal PF, a branch history table renewing or updating signal BH, and a "go-no go" selecting or "go" selecting signal GO. The prediction failure signal PF and the branch history table renewing signal BH will later be described in detail. The "go" selecting signal GO has the logic one and zero levels in the manner which will also be described later. Instead of the actual branch direction signal BD described hereinabove, the "go" selecting signal GO makes the instruction address selector 69 select, as the selected instruction address, the actual branch destination address of the actual branch information register 65 and the next instruction address of the instruction address adder 67 when the "go" selecting signal GO is given the logic one and zero levels, respectively.

The instruction prefetch control unit 152 is supplied with the address hit signal from the branch history table 46 as before and with the actual branch direction signal BD, the prediction failure signal PF, and the branch history table renewing signal BH. The selected instruction address is not delivered to the request address selector 42 in the instruction prefetching device being illustrated but only to the selected destination address register 71 and stored therein as the selected destination address. The selected destination address is merely fed to the branch history table 46 rather than also to the request address selector 42 in the manner described above. Instead, the request address selector 42 is supplied with the actual branch destination address from the actual branch information register 65 and the next instruction address from the instruction address adder 67.

In the manner which will become clear as the description proceeds, an instruction address recover register 157 has an accompanying selector which is similar to the request address selector 42. The accompanying selector is supplied from the request address adder 45 with the next request address, from the branch history table 46 with the branch information comprising a predicted branch destination address, from the actual branch information register 65 with the actual branch destination address, and from the instruction address adder 67 with the next instruction address. The instruction address recover register 157 delivers one of such addresses as a new destination address to the request address selector 42. The instruction prefetch control unit 152 controls not only the request address selector 42 but also the accompanying selector.

In the manner which will also become clear as the description proceeds, the predicted branch direction of a branch count instruction BCT is usually "go" to the branch, namely, is indicative of repeated execution of the branch count instruction BCT. The predicted branch direction is switched temporarily to "no go" to the branch, namely, to a temporary branch direction indicative of leave of the loop during penultimate execution of the branch count instruction BCT followed by ultimate execution of the branch count instruction on leaving the loop. The predicted branch direction is again switched to "go" to the branch, namely, to a usual branch direction indicative of the repeated execution during the ultimate execution.

Figure 24:
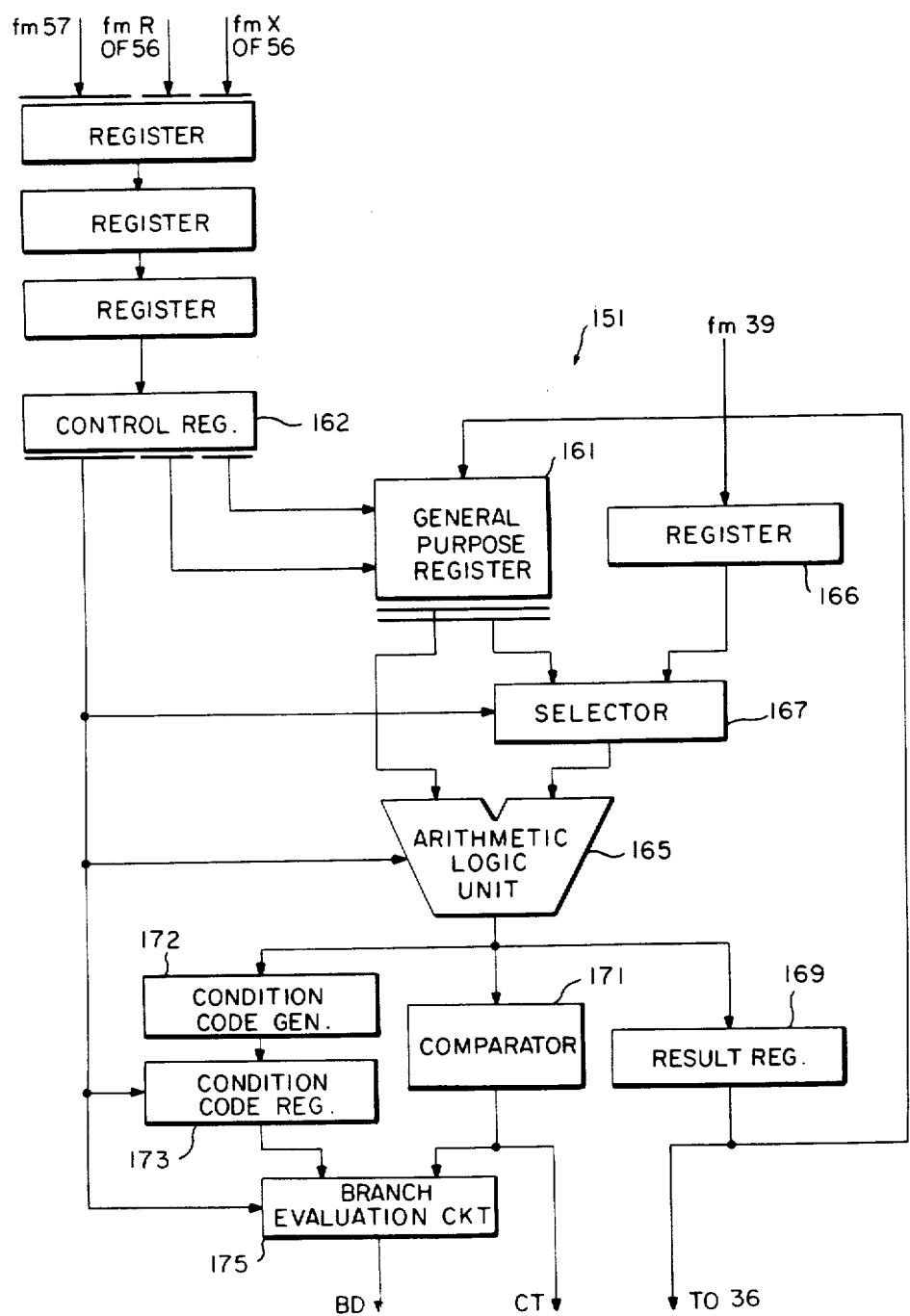
FIG. 24 is a block diagram of a part of the data processing system depicted in FIG. 23.

Turning to FIG. 24, the instruction executing circuit 151 is not much different from a conventional instruction executing circuit of the type thus far described and comprises a general purpose register 161. A control register 162 is for storing the decoded operation code and the R and the X fields received from the operation code decoder 57 and the instruction register 56 of the instruction decoding circuit 36 described in connection with FIG. 9 through three registers which are depicted outwardly of the instruction executing circuit 151 without the reference numerals and are for feeding the decoded operation code and the R and the X fields in timed relation to operation of the operand address generating circuit 37 (FIG. 1), the operand address translating circuit 38, and the operand reading unit 39, respectively. The general purpose register 161 is selected by the R and the X fields held in the control register 162 and twice produces its content.

An arithmetic logic unit 165 has first and second inputs. It is known in the art that the content of the general purpose register 161 is delivered directly to the first input of the arithmetic logic unit 165 and that the operand is delivered from the operand reading unit 39 to a register 166 and thence to a selector 167. Controlled by the decoded operation code held in the control register 162, the selector 167 selectively sends the content of the general purpose register 161 and the operand of the register 166 to the second input of the arithmetic logic unit 165. Controlled also by the decoded operation code, the arithmetic logic unit 165 produces a result of operation which is supplied to a result register 169 among others. The result of operation held in the result register 169 is delivered back to the instruction decoding circuit 36 on the one hand and to the general purpose register 161 on the other hand.

When the instruction executing circuit 151 is dealing with a branch count instruction BCT, the number of times of repeated execution of a loop for the branch count instruction BCT is set in the general purpose register 161. The arithmetic logic unit 165 subtracts one from the content of the general purpose register 161 to produce a reduced count as the result of operation each time when the loop is executed in compliance with the branch count instruction BCT. The reduced count is fed back to the general purpose register 161 through the result register 169. The general purpose register 161 therefore holds a count which is reduced one by one during repeated execution of the branch count instruction BCT.

The result of operation is delivered furthermore to a comparator 171 and to a condition code generator 172. The comparator 171 is for comparing the result of operation with a predetermined number to produce a result of comparison. It is known in the art that a condition code is generated by the condition code generator 172, is held in a condition code register 173 controlled by the decoded operation code, and is fed from the condition code register 173 to a branch evaluation circuit 175, which is supplied additionally with the result of comparison. Controlled by the decoded operation code held in the control register 162, the branch evaluation circuit 175 produces the actual branch direction signal BD for either of the general branch instruction and the branch count instruction BCT.

In the instruction executing circuit 151 for use in combination with the embodiment being illustrated, the result of comparison is produced as the count 1 signal CT when the instruction under execution is a branch count instruction BCT. The count 1 signal CT takes the logic one and zero levels when the count is equal to the predetermined number, such as unity, and is not, respectively. The predetermined number is selected so that the loop should be executed only once more and should be left when the count 1 signal CT has the logic one level and is turned back to the logic zero level, respectively. It should clearly be understood that the count 1 signal CT is somewhat different from the branch evaluation signal BE described before in that the count 1 signal CT indicates leave of the loop when switched back to the logic zero level immediately after turning to the logic one level.

Incidentally, it is convenient to understand that the illustrated portion of the instruction executing circuit 151 serves as an element used in the instruction prefetching device being illustrated in producing the actual branch direction signal BD for either of the general branch instruction and the branch count instruction BCT. The element is used in moreover producing the count 1 signal CT as a loop repetition signal indicative for a branch count instruction BCT, as by the logic one level, the above-mentioned penultimate execution. The loop repetition signal furthermore indicates, as by the logic one level, the ultimate execution and the repeated execution except for the penultimate execution. The instruction address translating circuit 33 serves an another element used in the instruction prefetching device in producing the actual branch destination address.

Figure 25:
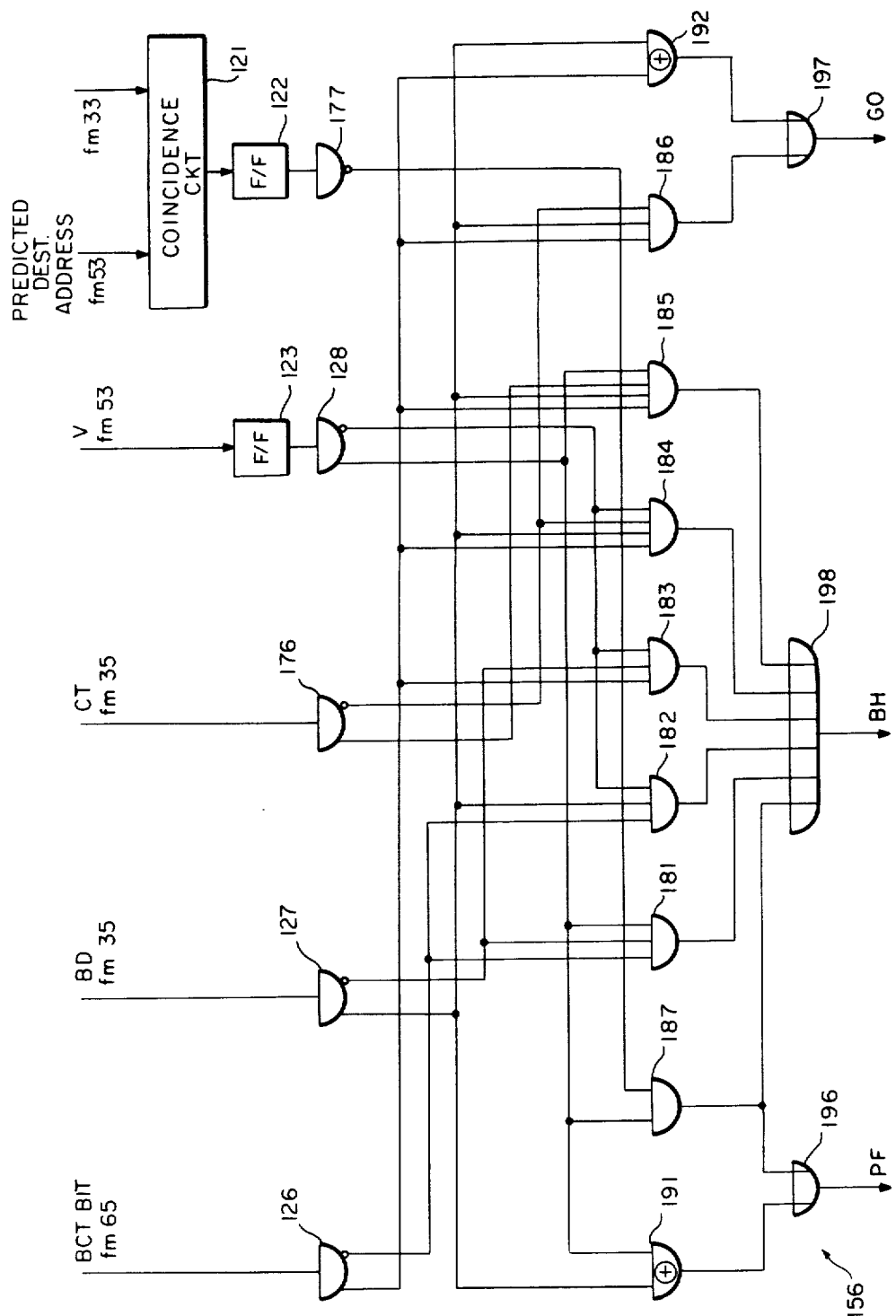
FIG. 25 is a block diagram of a prediction evaluating circuit for use in the instruction prefetching device illustrated in FIG. 23.

Further turning to FIG. 25, the prediction evaluating circuit 156 comprises the coincidence circuit 121, the flip-flops 122 and 123, the BCT bit true-false circuit 126, the actual branch direction true-false circuit 127, and the validity bit true-false circuit 128, all of which are described in conjunction with FIG. 17. A count 1 true-false circuit 176 is supplied with the count 1 signal from the instruction executing circuit 151 and produces an inverted count 1 signal and the count 1 signal as it stands. The coincidence signal is delivered from the coincidence circuit 121, held in the flip-flop 122, and fed thence to a NOT circuit 177 which produces the inverted coincidence signal of the type described hereinabove.

A first AND circuit 181 is supplied with the inverted BCT bit, the inverted actual branch direction signal, and the validity bit produced by the validity bit true-false circuit 128. A second AND circuit 182 is supplied with the inverted BCT bit, the actual branch direction signal from the actual branch direction true-false circuit 127, and the inverted validity bit. The BCT bit true-false circuit 126 delivers the BCT bit to third through sixth AND circuits 183, 184, 185, and 186. The actual branch direction true-false circuit 127 delivers the actual branch direction signal to the fourth through the sixth AND circuits 184 to 186. The third AND circuit 183 is additionally supplied with the inverted actual branch direction signal and the inverted validity bit. The fourth AND circuit 184 is supplied with the inverted count 1 signal and the inverted validity bit. The fifth AND circuit 185 is supplied with the count 1 signal from the count 1 true-false circuit 176 and the validity bit from the validity bit true-false circuit 128. The sixth AND circuit 186 is supplied with the inverted count 1 signal. A seventh AND circuit 187 is supplied with the validity bit from the validity bit true-false circuit 128 and the inverted coincidence signal.

A first Exclusive OR circuit 191 is supplied with the actual branch direction signal from the actual branch direction true-false circuit 127 and the validity bit from the validity bit true-false circuit 128. A second Exclusive OR circuit 192 is supplied with the BCT bit from the BCT bit true-false circuit 126 and the actual branch direction signal from the actual branch direction true-false circuit 127. A first two-input OR circuit 196 is for producing the prediction failure signal PF in response to outputs of the first Exclusive OR circuit 191 and the seventh AND circuit 187. A second two-input OR circuit 197 is for producing the "go" selecting signal GO in response to outputs of the second Exclusive OR circuit 192 and the sixth AND circuit 186. A six-input OR circuit 198 is for producing the branch history table renewing signal BH in response to outputs of the first through the fifth and the seventh AND circuits 181 to 185 and 187.

Referring to FIG. 26, the prediction evaluating circuit 156 illustrated with reference to FIG. 25 is operable in the manner depicted in first through fifteenth lines 1 to 15. Combinations of the logic one and zero levels are shown by 1 and 0, respectively, for the BCT bit, the actual branch direction signal BD, the count 1 signal CT, the validity bit V, and the coincidence between the predicted and the actual branch destination addresses. The coincidence is illustrated at COINC with coincidence and noncoincidence indicated by 1 to 0, respectively. The prediction failure signal PF, the branch history table renewing signal BH, and the "go" selecting signal GO are given the logic one and zero levels in the manner represented by 1 to 0, respectively. Incidentally, "don't care" is indicated by short horizontal lines.

When given the logic one level, the prediction failure signal PF makes the instruction prefetch control unit 152 again prefetch a new instruction in the manner which will later become clear. When given the logic one level, the branch history table renewing signal BH makes the write pulse flip-flop 72 produce a write pulse and furthermore makes the instruction prefetch control unit 152 control the request address selector 42 and the accompanying selector as will later become clear. In the manner described above, the "go" selecting signal GO controls the instruction address selector 69.

More particularly referring to FIGS. 25 and 26, the prediction failure signal PF is given the logic one level irrespective of the BCT bit and the count 1 signal CT in either of first and second cases which will be described in the following. The first case is a case where the actual branch direction is noncoincident with the predicted branch direction, namely, where the actual branch direction signal BD and the validity bit V have one and the other of the logic one and zero levels, respectively, in the manner indicated in the second through the fourth, the eighth through the tenth, and the thirteenth lines 2 to 4, 8 to 10, and 13. The second case is another case where the actual and the predicted branch directions are both towards the "go" to branch side and furthermore where the actual branch direction address is noncoincident with the predicted branch destination address, namely, where the actual branch direction signal BD and the validity bit V are both of the logic one level with the coincidence COINC rendered 0 as indicated in the fifth, the eleventh, and the fourteenth lines 5, 11, and 14.

When the instruction being executed is a general branch instruction and gives the logic zero level to the BCT bit, the branch history table renewing signal BH is given the logic one level in the manner described for the prediction failure signal PF and indicated in the second through the fifth lines 2 to 5. More specifically, the branch history table renewing signal BH is given the logic one level either when the actual and the predicted branch directions are noncoincident with each other or when the actual and the predicted branch directions are both "go" to the branch and moreover when the actual and the predicted branch destination addresses are noncoincident with each other.

When a branch count instruction BCT is under execution to give the logic one level to the BCT bit, the branch history table renewing signal BH is given the logic one level in one of third through sixth cases defined in the following. The third case is a case where the actual and the predicted branch directions are both "no go" to the branch, namely, where the actual branch direction signal BD and the validity bit V are both of the logic zero level in the manner indicated in the seventh line 7. The fourth case is a case where the predicted branch direction is towards the "go" to branch side and futhermore where the actual and the predicted branch destination addresses are noncoincident with each other, namely, where the validity bit V has the logic one level with the coincidence COINC rendered 0 as indicated in the eighth, the eleventh, and the fourteenth lines 8, 11, and 14. The fifth case is a case where the actual and the predicted branch directions are to the "go" and the "no go" to branch sides, respectively, and moreover where the loop should be left, namely, where the actual branch derection signal BD, the validity bit V, and the count 1 signal CT have the logic one, zero, and zero levels, respectively, in the manner indicated in the tenth line 10. The sixth case is a case where the actual and the predicted branch directions are both "go" to the branch and furthermore where the loop should be left, namely, where the actual branch direction signal DB, the validity bit V, and the count 1 signal CT are all of the logic one level as indicated in the fifteenth line 15.

If a general branch instruction is in execution to give the logic zero level to the BCT bit, the "go" selecting signal GO is given the logic one level as indicated in the fourth and the fifth lines 4 and 5 when the general branch instruction indicates "go" to the branch, namely, when the actual branch direction signal BD has the logic one level.

If a branch count instruction BCT is executed to give the logic one level to the BCT bit, the "go" selecting signal GO is given the logic one level in either of seventh and eighth cases specified in the following. The seventh case is a case where the branch count instruction BCT actually indicates "no go" to the branch, namely, where the actual branch direction signal BD is of the logic zero level in the manner indicated in the seventh and the eighth lines 7 and 8. The eighth case is another case where the branch count instruction BCT actually indicates "go" to the branch and additionally where the loop should be left, namely, where the actual branch direction signal BD is made to have the logic one level with the count 1 signal CT given the logic zero level as indicated in the tenth and the eleventh lines 10 and 11.

Briefly summarizing, it is possible to understand that the prediction failure signal and the branch history table renewing signal are concurrently produced for the general branch instruction either unless the predicted branch direction is coincident with the actual branch direction or unless the predicted branch destination address is coincident with the actual branch destination address despite coincidence between the predicted and the actual branch directions. The prediction failure signal and the branch history table renewing signal are concurrently produced for the branch count instruction BCT when the loop repetition signal indicates the repeated execution and furthermore when the predicted branch direction indicates leave of the loop despite the actual branch direction indicative of the repeated execution, namely, when the branch history table 46 does not store the branch information for a branch count instruction BCT indicative of the repeated execution except the penultimate execution. Only the branch history table renewing signal is singly produced for the branch count instruction BCT when the loop repetition signal indicates either of the penultimate and the ultimate execution.

Figure 27:
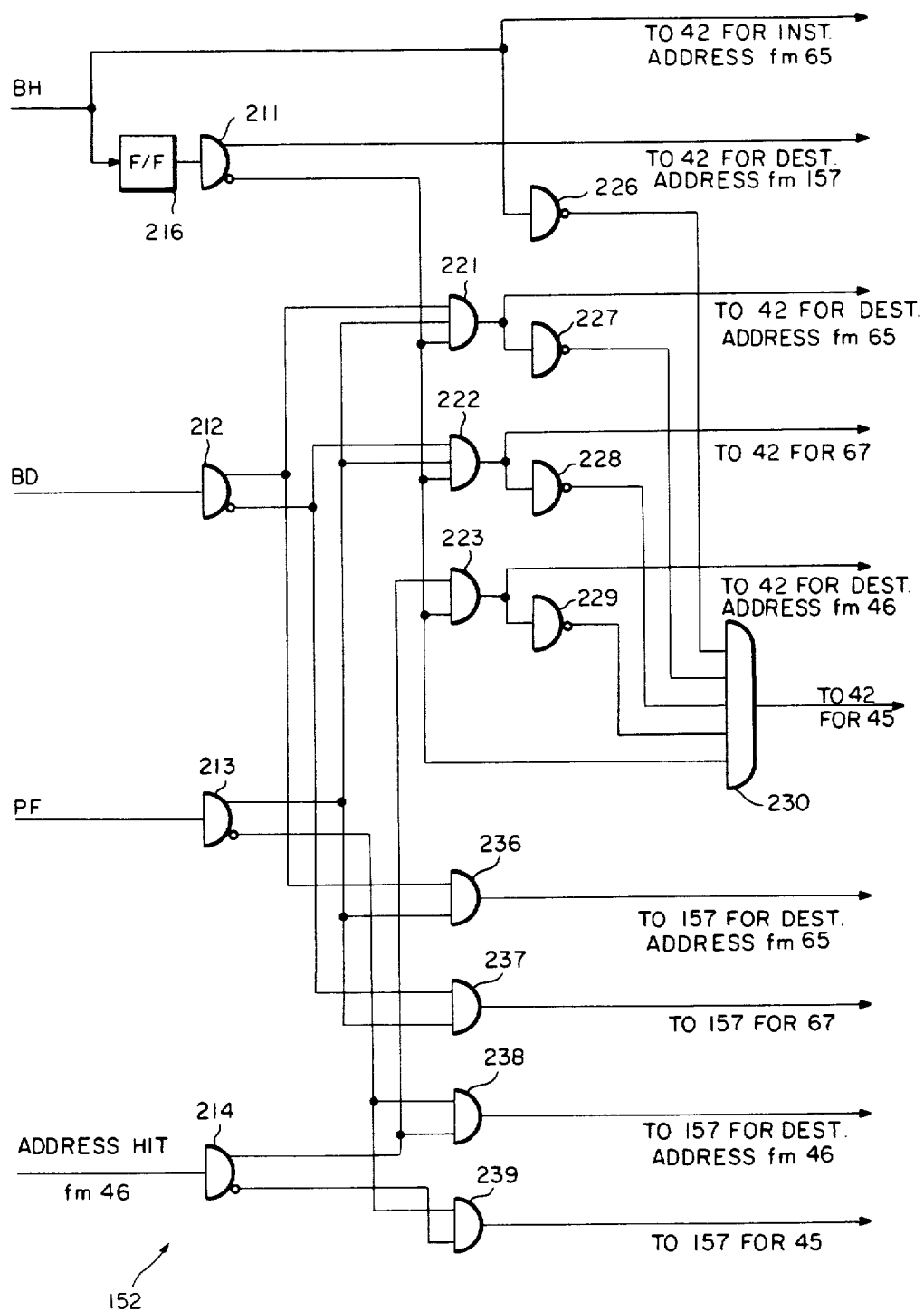
FIG. 27 is a block diagram of an instruction prefetch control unit for use in the instruction prefetching device shown in FIG. 23.

Turning to FIG. 27, the instruction prefetch control unit 152 comprises first through fourth true-false circuits 211, 212, 213, and 214 supplied with the branch history table renewing signal BH held in a flip-flop 216 during one machine cycle, the actual branch direction signal BD, the prediction failure signal PF, and the address hit signal, respectively. The branch history table renewing signal BH is delivered as it is to the request address selector 42 as a first selection signal. Responsive to the first selection signal, the request address selector 42 selects the current branch instruction address fed thereto from the actual branch information register 65. The first true-false circuit 211 delivers the branch history table renewing signal BH with a delay of one machine cycle as a second selection signal to the request address selector 42 which selects thereupon the new destination address fed thereto from the instruction address recover register 157.

First through third AND circuits 221 222, and 223 are enabled by an inverted branch history table renewing signal supplied thereto from the first true-false circuit 211 with the delay of one machine cycle. Additionally responsive to the actual branch direction signal and the prediction failure signal fed from the second and the third true-false circuits 212 and 213, respectively, the first AND circuit 221 delivers a third selection signal to the request address selector 42 to make the same select the actual branch destination address fed thereto from the actual branch information register 65. Responsive to an inverted actual branch direction signal delivered from the second true-false circuit 212 and to the prediction failure signal supplied from the third true-false circuit 213 as it stands, the second AND circuit 222 feeds a fourth selection signal to the request address selector 42 for selection of the next instruction address fed from the instruction address adder 67. Responsive to the address hit signal supplied from the fourth true-false circuit 214 as it is, the third AND circuit 223 delivers a fifth selection signal to the request address selector 42 for selection of the predicted branch destination address fed from the branch history table 46 as the branch information.

First through fourth NOT circuits 226, 227, 228, and 229 are supplied with the second through the fifth selection signals, respectively. The NOT circuits 226 through 229 send inverted second through fifth selection signals to a four-input AND circuit 230, which delivers a sixth selection signal to the request address selector 42 to make the latter select the next request address fed thereto from the request address adder 45.

A first additional AND circuit 236 is supplied with the actual branch direction signal and the prediction failure signal from the second and the third true-false circuits 212 and 213, respectively, as they stand. The first additional AND circuit 236 delivers a first additional selection signal to the accompanying selector of the instruction address recover register 157 for selection of the actual branch destination address fed from the actual branch information register 65. Responsive to the inverted prediction failure signal and the prediction failure signal supplied from the third true-false circuit 213 as it is, a second additional AND circuit 237 delivers a second additional selection signal to the accompanying selector which selects the next instruction address fed thereto from the instruction address adder 67. Responsive to the inverted prediction failure signal and the address hit signal supplied from the fourth true-false circuit 214 as it stands, a third additional AND circuit 238 delivers a third additional selection signal to the accompanying selector to make the latter select the predicted branch destination address fed thereto from the branch history table 46. Responsive to the inverted prediction failure signal and the inverted address hit signal, a fourth additional AND circuit 239 delivers a fourth additional selection signal to the accompanying selector to make the same select the next request address fed thereto from the request address adder 45.

It is now understood that the branch history table renewing signal BH of the logic one level makes the instruction address register 41 hold the current branch instruction address of the actual branch information register 65 and, one machine cycle thereafter, the new destination address of the instruction address recover register 157. When the "go" to branch side is indicated by the actual branch direction signal BH and is nevertheless incorrect according to the prediction failure signal PF, the actual branch destination address of the actual branch information register 65 is stored in both of the instruction address register 41 and the instruction address recover regester 157. When the "no go" to branch side is indicated by the actual branch direction signal BD despite the incorrectness indicated by the prediction failure signal PF, the next instruction address of the instruction address adder 67 is stored in the instruction address register 41 and the instruction address recover register 157. When the address hit signal has the logic one level, the predicted branch destination address of the branch history table 46 is set in the instruction address register 41. In other cases, the next request address of the request address adder 45 is set in the instruction address register 41. If the prediction failure signal PF indicates incorrectness of the prediction with the address hit signal given the logic one level, the next instruction address of the instruction address adder 67 is stored in the instruction address recover register 157. If the prediction failure signal PF indicates correctness of the prediction with the address hit signal given the logic zero level, the next request address of the request address adder 45 is stored in the instruction address recover register 157.

Figure 28:
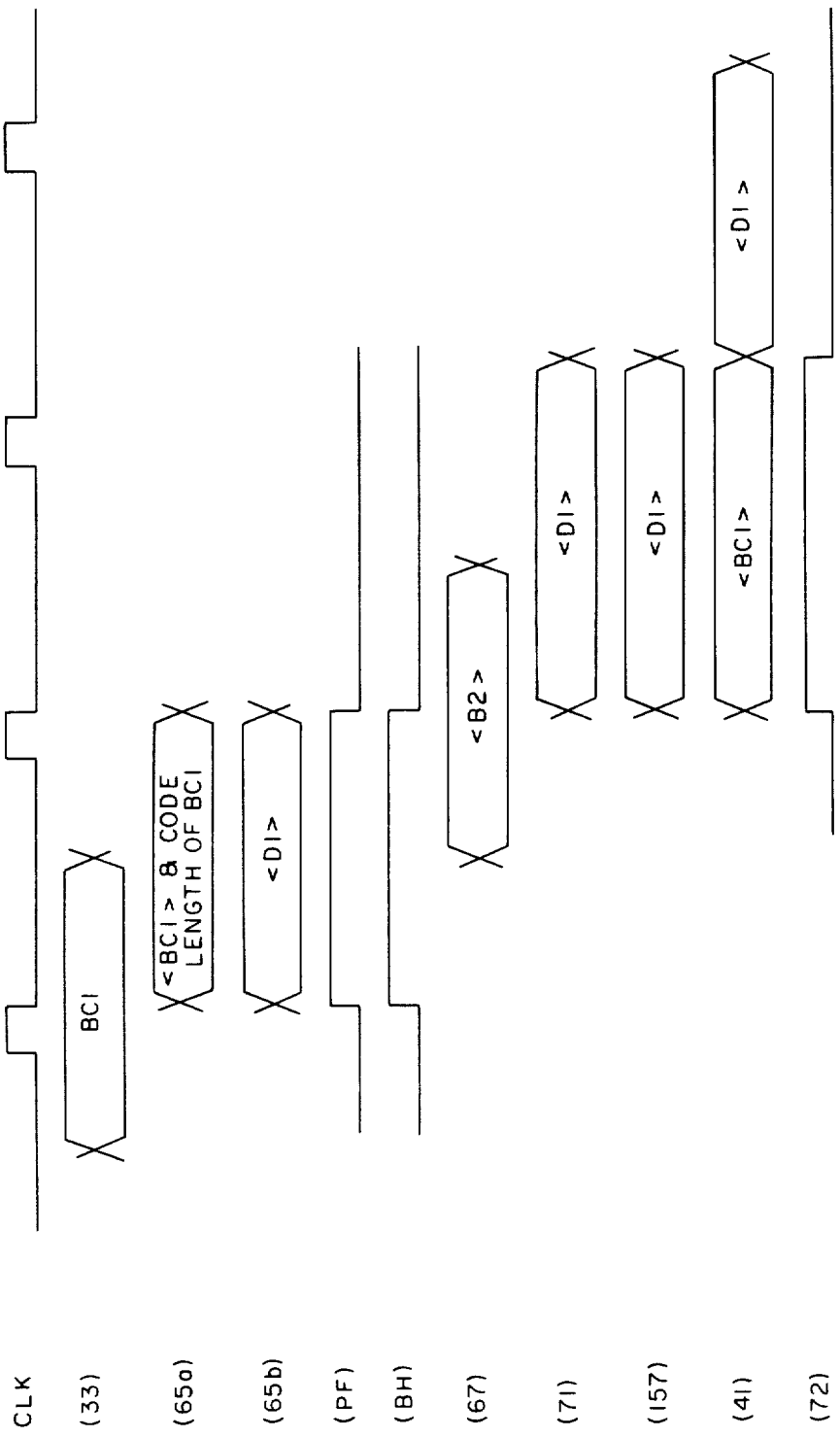
FIG. 28 is a schematic diagram for use in describing operation of the instruction prefetching device illustrated in FIG. 23.

Referring now to FIG. 28 which is similar to FIG. 21, operation of the instruction address translating circuit 33, the address information field of the actual branch information register 65, and the branch information field thereof is schematically depicted along lines labelled (33), (65a), and (65b), respectively. The prediction failure signal PF and the branch history table renewing signal BH are illustrated along lines specified by (PF) and (BH), respectively. Operation of the instruction address adder 67, the selected destination address register 71, the instruction address recover register 157, the instruction address register 41, and the write pulse flip-flop 72 is shown along lines indicated by (67), (71), (157), (41), and (72).

It will now be assumed that the instruction address translating circuit 33 is carrying out the address translation for a general branch instruction BC1 in the manner illustrated in FIG. 21 and along the line labelled (33) and that the instruction executing circuit 151 later finds that the actual branch direction is "go" to the branch despite the predicted branch direction towards the "no go" to branch side. Nearly one machine cycle after the address translation for the branch instruction BC1, the instruction code length of the branch instruction BC1 and the current instruction address <BC1> are stored in the actual branch information register 65 as shown along the line (65a) from the third branch information register 53. The actual branch destination address <D1> of an instruction D1 on the "go" to branch side is stored in the actual branch information register 65 from the instruction address translating circuit 33 as depicted along the line (65b). The validity bit V is kept in the third branch information register 53 with the logic zero level indicative of the predicted branch direction of "no go" to the branch and is delivered, about one machine cycle earlier, to the prediction evaluating circuit 156.

Substantially at the instant of storage of the address information and the branch information in the actual branch information register 65, the prediction evaluating circuit 156 switches the prediction failure signal PF and the branch history table renewing signal BH to the logic one level in the manner illustrated along the lines (PF) and (BH) and in FIG. 26 in the fourth line 4. Irrespective of the prediction failure signal PF and the branch history table renewing signal BH, the instruction address adder 67 calculates the next instruction address <B2> of an instruction B2 on the "no go" to branch side in the manner depicted along the line (67).

The "go" selecting signal GO has the logic one level according to the fourth line 4 of FIG. 26. The instruction address selector 69 therefore stores the actual branch destination address <D1> in the selected destination address register 71 in the manner depicted along the line (71).

The current instruction address <BC1> is delivered to the instruction address register 41 directly from the actual branch information register 65. Likewise, the actual branch destination address >D1> is fed towards the instruction address register 41 and the instruction address recover register 157. Inasmuch as the actual branch direction signal BD and the prediction failure signal PF are both of the logic one level, the first additional selection signal (FIG. 27) stores the actual branch destination address <D1> in the instruction address recover register 157 as illustrated along the line (157). Inasmuch as the branch history table renewing signal BH is switched to the logic one level, the first selection signal (FIG. 27) stores the current instruction address <BC1> in the instruction address register 41 as depicted along the line (41) on the left side.

One machine cycle after turning of the branch history table renewing signal BH to the logic one level and substantially concurrently with storage of the current instruction address <BC1> in the instruction address register 41, the write pulse flip-flop 72 produces the write pulse illustrated along the line (72). In the example illustrated in FIG. 19, the branch history table 46 stores no predicted branch destination address and the logic zero validity bit in correspondence to the current instruction address <BC1>. The write pulse stores the actual branch destination address <D1> and the logic one validity bit in correspondence to the current instruction address <BC1>.

One machine cycle thereafter, the second selection signal transfers the actual branch destination address <D1> to the instruction address register 41 as shown along the line (41) on the right side from the instruction address recover register 157. The instruction D1 is prefetched.

If the actual and the predicted branch directions are both "go" to the branch, the prediction failure signal PF is switched to the logic one level as shown in FIG. 26 in the fifth line 5 when the actual branch destination address <D1> obtained by the instruction translating circuit 33 is noncoincident with the predicted branch destination address stored in the branch history table 46 and delivered to the prediction evaluating circuit 156. The branch history table renewing signal BH and the "go" selecting signal GO are also turned to the logic one level. Operation proceeds in the manner depicted in FIG. 28 with the predicted branch destination address renewed by the write pulse to the actual branch destination address <D1>.

If the actual branch direction is "no go" to the branch despite the predicted branch direction of "go" to the branch, the prediction failure signal PF and the branch history table renewing signal BH are turned to the logic one level in the manner which is illustrated along the lines (PF) and (BH) and is shown in FIG. 26 in either of the second and the third lines 2 and 3. The "go" selecting signal GO is, however, kept at the logic zero level.

The instruction address selector 69 selects the next instruction address <B2>, which is stored in the selected destination address register 71. Inasmuch as the actual branch direction signal BD indicates "no go" to the branch, the second additional selection signal (FIG. 27) stores the next instruction address <B2> in the instruction address recover register 157. The first selection signal sets the current instruction address <BC1> in the instruction address register 41. The write pulse resets the logic one validity bit indicative of the predicted branch direction of the "go" to branch side. One machine cycle thereafter, the second selection signal transfers the next instruction address <B2> from the instruction address recover register 157 to the instruction address register 41 for prefetch of the instruction B2.

Figure 29:
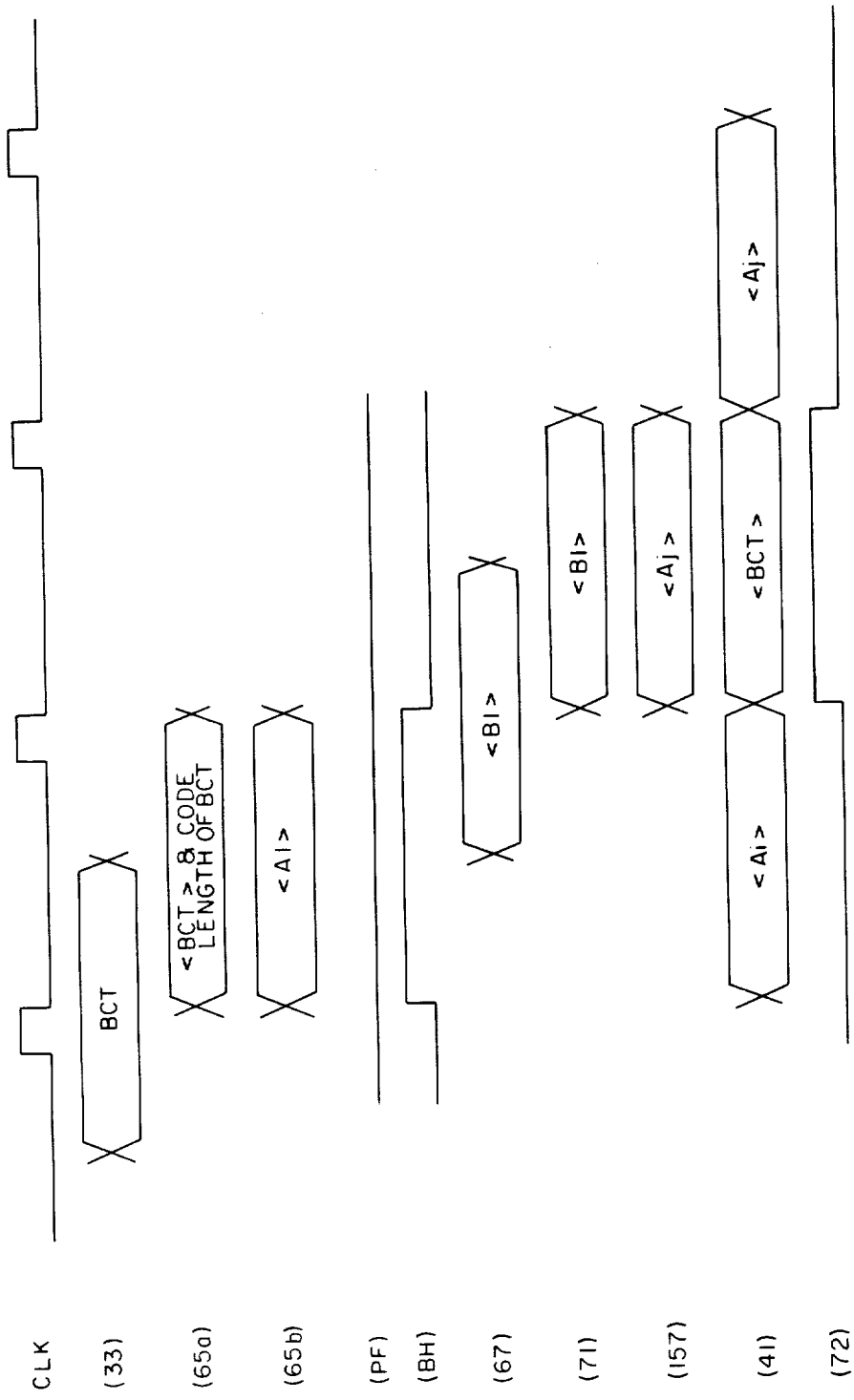
FIG. 29 is another schematic diagram for use in describing operation of the instruction prefetching device illustrated in FIG. 23.

Turning to FIG. 29, it will now be assumed that the instruction address translating circuit 33 carries out the address translation on a branch count instruction BCT described in connection with FIG. 7 and that the count 1 signal CT is switched to the logic one level. It is already pointed out that the count 1 signal CT of the logic one level indicates that the first through the n-th instructions A1 to An should be prefetched with the penultimate execution of the branch count instruction BCT immediately followed. Before the penultimate execution, the branch count instruction BCT indicates the usual branch direction of "go" to the branch as the predicted branch direction.

When the logical address of the branch count instruction BCT is delivered to the instruction address translating circuit 33, the third branch information register 53 is loaded with the BCT bit produced by the instruction decoding circuit 36 with the logic one level, the instruction code length of the branch count instruction BCT, the current instruction address <BCT>, and the validity bit V indicative of the predicted branch direction of the "go" to branch side. When the instruction address translating circuit 33 deals with the branch count instruction BCT, the actual branch information register 65 is loaded with the address information of the branch count instruction BCT and with an actual branch destination address <A1> of the first instruction A1 which follows the branch count instruction BCT on the "go" to branch side.

Inasmuch as the predicted and the actual branch directions are both "go" to the branch with the predicted and the actual branch destination addresses coincident with each other and with the count 1 signal CT turned to the logic one level, the prediction failure signal PF is kept at the logic zero level while the branch history table renewing signal BH is switched to the logic one level in the manner illustrated along the lines (PF) and (BH) and in FIG. 26 in the fifteenth line 15. Irrespective of coincidence and noncoincidence between the actual and the predicted branch directions and other conditions, the instruction address adder 67 produces a next instruction address <B1> of the above-mentioned other instruction B1.

The "go" selecting signal GO has the logic zero level as indicated in FIG. 26 in the fifteenth line 15. The instruction address selector 69 therefore stores the next instruction address <B1> in the selected destination address register 71 in the manner depicted along the line (71).

The current instruction address <BCT> is supplied to the instruction address register 41 directly from the actual branch information register 65. Similarly, the actual branch destination address <A1> is delivered towards the instruction address register 41 and the instruction address recover register 157. Inasmuch as neither of the first and the second additional selection signals (FIG. 27) is produced, the instruction address recover register 157 is not loaded with the actual branch destination address <A1>. The first selection signal stores the current instruction address <BCT> in the instruction address register 41 in the manner illustrated along the line (41) in the middle part.

One machine cycle earlier, the instruction address <A1> is set in the instruction address register 41 as depicted along the line (41) in the leftmost part for the ultimate prefetch of the first instruction A1. The request address adder 45 calculates a next request address. It will be presumed that the instruction address <A2> of the second instruction A2 is given by the next request address. When the first instruction A1 is neither a general branch instruction nor a branch count instruction BCT, the address hit signal has the logic zero level. The fourth additional selection signal (FIG. 27) therefore stores the next request address <A2> in the instruction address recover register 157 as shown along the line (157).

When the write pulse flip-flop 72 produces the write pulse in the manner depicted along the line (72), the selected destination address register 71 is loaded with the next instruction address <B1> on the "no go" to branch side. The write pulse therefore only resets the validity bit V in the branch history table 46. It will be understood that the predicted branch direction is switched to the "no go" to branch side. One machine cycle thereafter, the second selection signal transfers the next request address <A2> from the instruction address recover register 157 to the instruction address register 41 as shown along the line (41) in the rightmost part. The second instruction A2 is prefetched. One machine cycle is lost in renewing the validity bit V in the branch history table 46.

If the first instruction A1 is a branch instruction for which the second entry is valid, the third additional selection signal stores the predicted branch destination address in the instruction address recover register 157. The prefetch may proceed to the predicted branch destination address.

It will now be assumed that the count 1 signal CT is switched back to the logic zero level to indicate that the loop should be left after the first through the n-th instructions. A1 to An are ultimately prefetched before leave of the loop with the ultimate execution of the branch count instruction BCT immediately following the prefetch. After the penultimate execution of the branch count instruction BCT and before the ultimate execution thereof, the branch count instruction BCT indicates the "no go" to the branch as the temporary branch direction. The actual branch direction is also "no go" to the branch. The actual branch destination address is the instruction address <A1> of the first instruction A1.

According to the seventh line 7 of FIG. 26, the prediction failure signal PF is held at the logic zero level and the branch history table renewing signal BH has the logic one level as shown along the lines (PF) and (BH). The instruction address adder 67 again produces the next instruction address <B1>.

The "go" selection signal GO has the logic one level according to the seventh line 7 of FIG. 26. The instruction address selector 69 therefore stores the actual branch destination address <A1> in the selected destination register 71.

Inasmuch as the actual direction signal BD and the prediction failure signal PF are both of the logic zero level, the second additional selection signal stores the next instruction address <B1> in the instruction address recover register 157. As before, the first selection signal sets the current instruction address <BCT> in the instruction address register 41.

When the write pulse is produced in the manner depicted along the line (72), the branch history table 46 is renewed to the actual branch destination address <A1> with the validity bit V made to indicate the "go" to branch side as the predicted branch direction. One machine cycle thereafter, the second selection signal moves the next instruction address <B1> from the instruction address recover register 157 to the instruction address register 41. The other instruction B1 is prefetched. It is understood that one machine cycle is again lost in updating the branch history table 46 for the branch count instruction BCT and that no machine cycle is lost on again entering the loop because the branch count instruction BCT and the branch information therefor are correctly stored in the branch history table 46.

It is now understood that the validity bit V indicative of the predicted branch direction is renewed to indicate the temporary branch direction in response to the branch history table renewing signal which is singly produced for the branch count instruction BCT when the loop repetition signal indicates the penultimate execution of the branch count instruction BCT. The validity bit V indicative of the temporary branch direction is renewed to indicate the usual branch direction with the predicted branch destination address made to indicate the instruction address of the first instruction A1 in response to the branch history table renewing signal which is singly produced for the branch count instruction BCT when the loop repetition signal indicates the ultimate execution of the branch count instruction BCT.

Incidentally, the prefetch proceeds in the manner described with reference to FIG. 28 when the actual and the predicted branch destination addresses are noncoincident with each other as shown in FIG. 26 in either of the eleventh and the fourteenth lines 11 and 14.

Figure 30:
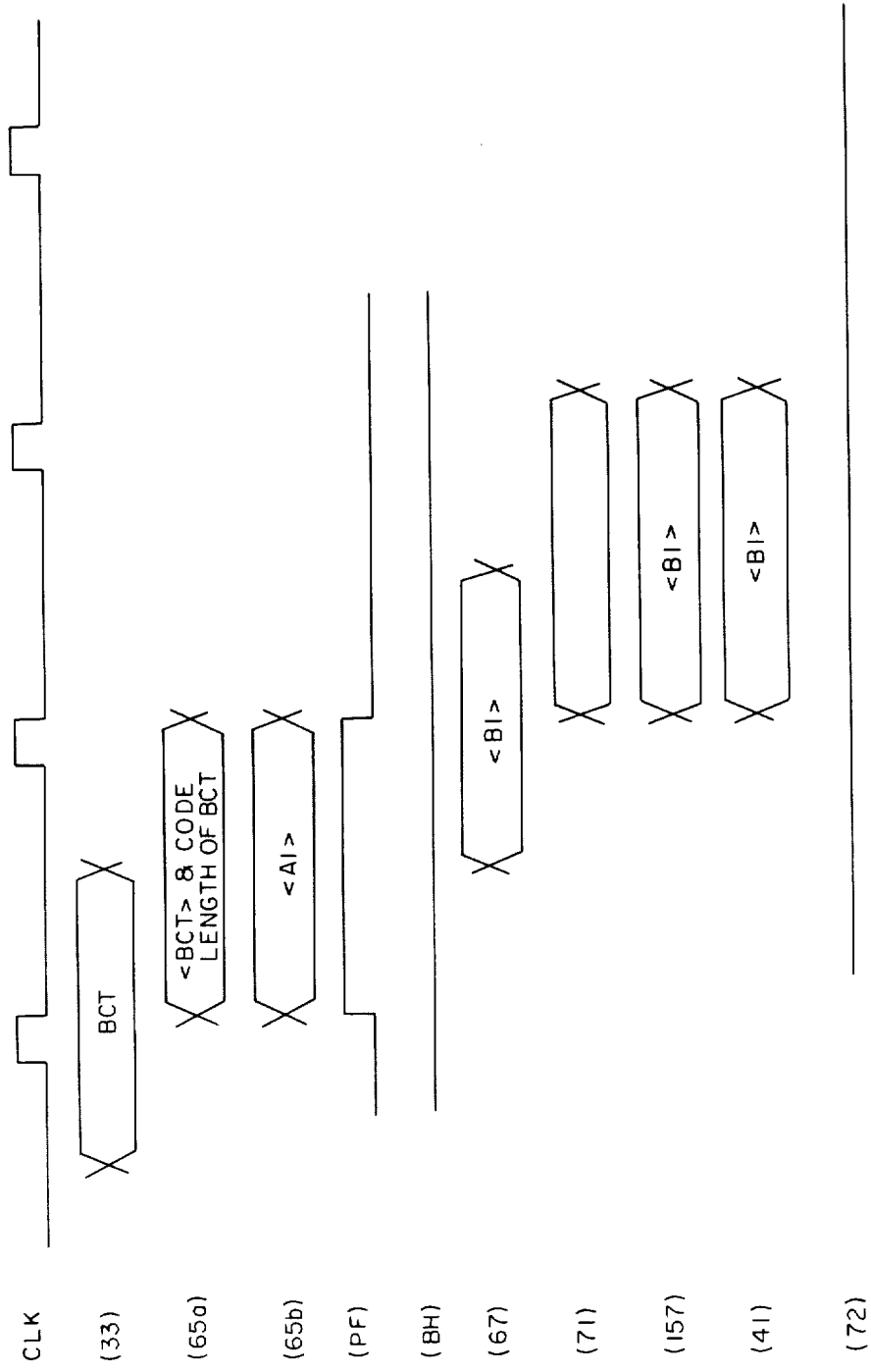
FIG. 30 is still another schematic diagram for use in describing operation of the instruction prefetching device depicted in FIG. 23.

Further turning to FIG. 30, it will now be assumed that the predicted branch direction is "go" to the branch for the branch count instruction BCT and that the actual branch direction is "no go" to the branch with the predicted and the actual branch destination addresses coincident with each other. As in FIG. 29, the actual branch destination address <A1> is stored in the branch information field of the actual branch information register 65.

In the manner illustrated along the lines indicated by labels (PF) and (BH), the prediction failure signal PF is switched to the logic one level and the branch history table renewing signal BH is kept at the logic zero level according to the ninth line 9 of FIG. 26.

When the actual branch direction signal BD indicative of the "no go" to branch side is produced, the second additional selection signal (FIG. 27) stores the next instruction address <B1> in the instruction address recover register 157. The fourth selection signal sets the next instruction address <B1> in the instruction address register 41. Prefetch proceeds to the other instruction B1.

If the predicted and the actual branch directions are to the "no go" and the "go" to branch sides, respectively, with the count 1 signal CT turned to the logic one level, the prediction failure signal PF and the branch history table renewing signal BH have the logic one and zero levels, respectively, according to the thirteenth line 13 of FIG. 26. When the actual branch direction signal BD indicative of the "go" to branch side is produced, the first additional selection signal stores the actual branch destination address <A1> in the instruction address recover register 157. The third selection signal sets the actual branch destination address <A1> in the instruction address register 41. Prefetch proceeds to the first instruction A1.

Incidentally, the write pulse is not produced. The branch history table 46 is left untouched. The selected destination register 71 may or may not be loaded with either of the next requist address <B1> and the actual branch destination address <A1>.

If the predicted and the actual branch directions are towards the "no go" and the "go" to branch sides, respectively, with the predicted and the actual branch destination addresses coincident with each other in the manner illustrated in the eighth line 8 of FIG. 26, prefetch proceeds as described in connection with FIG. 28. Also if the predicted and the actual branch directions are to the "no go" and the "go" to branch sides, respectively, with the count 1 signal CT kept at the logic zero level as depicted in the tenth line 10 of FIG. 26, prefetch proceeds in the manner described in conjunction with FIG. 28. The case indicated in the tenth line 10 occurs when the branch information should be stored anew in the branch history table 46 for a branch count instruction BCT.

It is important to note the case described in conjuction with the tenth line 10 of FIG. 26. The second entry which corresponds in the branch history table 46 to the instruction address of the branch count instruction, is refreshed in this case in response to the prediction failure signal and the branch history table renewing signal which are concurrently produced for the branch count instruction BCT. The prediction failure signal and the branch history table renewing signal are so produced because the predicted branch direction is not stored in the branch history table 46 and indicates "no go" to the branch despite the actual branch direction of the "go" to branch side and because the loop repetition signal indicates the repeated execution of the branch count instruction BCT.

Reviewing FIGS. 28 through 30, it will be appreciated that the average loss cycle is only one machine cycle long for each general branch instruction. Five machine cycles are lost on entering a loop by executing a new branch count instruction BCT for which the address information and the branch information are not stored in the branch history table 46. No machine cycle is lost on entering a loop for a branch count instruction BCT which has the address information and the branch information already in the branch history table 46. No machine cycle is lost during repeated instruction prefetch through the loop except for the penultimate and the ultimate execution of the branch count instruction BCT. One machine cycle is lost for each of the penultimate and the ultimate execution on leaving the loop. This is shorter than the loss cycle of four machine cycles which are necessary on leaving a loop with the instruction prefetching device illustrated with reference to FIG. 1.

While this invention has so far been described in connection with two embodiments thereof, it will now be readily possible for one skilled in the art to put this invention into practice in various other manners. Above all, reference to the above-cited later patent application will be useful on further modifying the instruction prefetching device described and claimed in the instant specification.

What is claimed is:

1. An instruction prefetching device for use in carrying out prefetch of an instruction sequence in a data processing system which includes an executing unit, said instruction prefetching device comprising:

a branch history table for storing a plurality of entry pairs, each entry pair comprising a first entry specifying an instruction address of a branch instruction executed by said executing unit prior to said prefetch and a corresponding second entry specifying branch information which comprises a predicted branch destination address obtained by previous execution of said branch instruction;

retrieving means connected to said branch history table for retrieving said corresponding second entry from said branch history table in response to a current instruction address of a current instruction being prefetched when said current instruction address specifies one of said first entries;

discriminating means connected to said executing unit for discriminating whether said branch instruction executed by said executing unit is a branch count instruction or a general branch instruction and providing a result of discrimination; and prefetching means responsive to said corresponding second entry retrieved by said retrieving means and responsive to said result of discrimination for carrying out said prefetch, wherein said prefetching means comprises:

prediction evaluating means, connected to receive said corresponding second entry, said result of discrimination, and a resulting address of execution based on said current instruction, for evaluating said corresponding second entry to produce a predicted direction evaluation signal and a predicted address evaluation signal, said predicted direction evaluation signal existing in one of:

(1) a first state, wherein at least one more execution of a program loop is required, and (2) a second state, wherein said program loop is to be exited, said predicted address evaluation signal existing in one of:

(1) a first state, wherein said predicted branch destination address of said corresponding second entry coincides with said resulting address of execution, and (2) a second state, wherein said predicted branch destination address of said corresponding second entry does not coincide with said resulting address of execution;

controlling means, connected to receive said corresponding second entry, said predicted direction evaluation signal and said predicted address evaluation signal, for continuing said prefetch when said predicted direction evaluation signal is in said first state; and wherein said prefetching means further comprises:

renewing means responsive to the result of the discrimination being a branch on count instruction so as not to update said branch history table when the actual branch address direction shows a NO GO, the predicted direction evaluation signal is in said second state and the predicted address evaluation signal is in said first state; and means responsive to said updated corresponding second entry for carrying out said prefetch.

2. An instruction prefetching device as claimed in claim 1, wherein said prefetching means further comprises:

first means responsive to said branch count instruction for producing a loop repetition signal indicative of a penultimate execution of said branch count instruction; and second means responsive to said corresponding second entry, said result of discrimination, and said loop repetition signal for carrying out said prefetch.

3. An instruction prefetching device as claimed in claim 2, wherein;

said branch history table is for storing the entry pairs in which the branch information specified by each of said corresponding second entries further comprises a predicted branch direction obtained by previous execution of one of said branch count instruction and said general branch instruction;

said prefetching means further comprising:

third means operatively connected to be responsive to either of said branch count instruction and said general branch instruction for setting a flag indicative of an actual branch direction in which said prefetch should proceed;

fourth means operatively connected to be responsive to either of said branch count instruction and said general branch instruction for producing an actual branch destination address to which said prefetch should proceed; and said prediction evaluation means operatively connected to be responsive to said corresponding second entry, said actual branch flag direction and branch destination address, and said loop repetition signal for evaluation said corresponding second entry to produce a prediction failure signal and a branch history table renewing signal, said prediction failure signal and said branch history table renewing signal being concurrently produced for said general branch instruction unless either of the predicted branch direction specified by said corresponding second entry as a specified branch direction is coincident with said actual branch direction and the predicted branch destination address specified by said corresponding second entry as a specified branch destination address is coincident with said actual branch destination address despite coincidence between said specified and said actual branch directions, said prediction failure signal and said branch history table renewing signal begin concurrently produced for said branch count instruction when said loop repetition signal indicates said repeated execution and furthermore when said specified branch direction indicates said loop is to be exited despite the actual branch direction indicating said loop is to be repeated, only said branch history table renewing signal being produced for said branch count instruction when said loop repetition signal indicates either of said penultimate and said ultimate execution;

said second means comprising:

means operatively connected to be responsive to said corresponding second entry and coupled to said prediction evaluating means for continuing said prefetch when neither of said prediction failure signal and said branch history table renewing signal are produced for either of said general branch instruction and said branch count instruction;

renewing means operatively connected to be responsive to said prediction failure signal and said branch history table renewing signal for updating said corresponding second entry to an updated corresponding second entry when the prediction failure signal and the branch history table renewing signal are concurrently produced for either of said general branch instruction and said branch count instruction, said renewing means updating the specific branch direction for said branch count instruction to a temporary branch direction indicating said loop is to be exited and updating said temporary branch direction to an usual branch direction indicating said loop is to be repeated in response to the branch history table renewing signal produced when said loop repetition signal indicates said penultimate and said ultimate execution, respectively; and means responsive to one of said updated corresponding second entry and said temporary and said usual branch directions for carrying out said prefetch.

4. An instruction prefetching device as claimed in claim 1, wherein
(a) said renewing means is responsive to the predicted direction evaluation signal in said second state irrespective of the result of the discriminating means, for updating a current address to the first entry of the branch history table and updating an actual branch destination address to the corresponding second entry,
(b) said renewing means further being responsive to the predicted direction evaluation signal in the first state and the predicted address evaluation signal in the second state, for updating an actual branch destination address, and
(c) said renewing means responsive to the result of discrimination in a general branch instruction, when the actual branch direction shows NO GO and the predicted direction evaluation signal is in said second state, for invalidating contents of said first entry and said corresponding second entry of an entry pair.

5. An instruction prefetching device as claimed in claim 1, wherein
(a) said renewing means is responsive to the predicted direction evaluation signal in said second state irrespective of the result of the discrimination means, for updating a current address to the first entry of the branch history table and updating an actual branch destination address to the corresponding second entry,
(b) said renewing means further being responsive to the predicted direction evaluation signal in the first state and the predicted address evaluation signal in the second state, for updating an actual branch destination address,
(c) said renewing means responsive to the result of discrimination in a general branch instruction, when the actual branch direction shows NO GO and the predicted direction evaluation signal is in said second state, for invalidating contents of the first entry and the corresponding second entry of an entry pair,
(d) said renewing means responsive to the result of discrimination in the branch on count instruction, so as not to update the contents of the branch history table, when the predicted address evaluation signal takes a first state, and
(e) said renewing means responsive to the result of discrimination in the branch on count instruction when the predicted address evaluation signal assumes a second state, for invalidating contents of said first entry and said corresponding second entry of an entry pair.

6. An instruction prefetching device as claimed in claim 1, wherein
(a) said renewing means responsive to the predicted direction evaluation signal in said second state irrespective of the result of the discriminating means, for updating a current address to the first entry of the branch history table and updating an actual branch destination address to the corresponding second entry,
(b) said renewing means further being responsive to the predicted direction evaluation signal in the first state and predicted address evaluation signal in the second state, for updating an actual branch destination address,
(c) said renewing means responsive to the result of discrimination in a general branch instruction, when the actual branch direction shows NO GO and the predicted direction evaluation signal takes a second state, for invalidating contents of said first entry and said corresponding second entry of an entry pair,
(d) said renewing means responsive to the result of discriminating in a branch on count instruction, so as not to update the contents of the branch history table, when the predicted address evaluation signal takes a first state, and
(e) the renewing means responsive to the result of discrimination in the branch on count instruction when the predicted address evaluation signal take a second step, for updating an actual branch destination address to said corresponding second entry.

7. An instruction prefetching device as recited in claim 1, wherein said renewing means is responsive to the result of discrimination being a branch on count instruction so as not to update said branch history table when the actual branch address direction shows a NO GO irrespective of the state of said prediction direction evaluation signal and said predicted address evaluation signal.

8. An instruction prefetching device as recited in claim 4, wherein said renewing means is responsive to the result of discrimination being a branch on count instruction so as not to update said branch history table when the actual branch address direction shows a NO GO irrespective of the state of said prediction direction evaluation signal and said predicted address evaluation signal.

9. An instruction prefetching device as recited in claim 6, wherein said renewing means is responsive to the result of discrimination being a branch on count instruction so as not to update said branch history table when the actual branch address direction shows a NO GO irrespective of the state of said prediction direction evaluation signal and said predicted address evaluation signal.

10. An instruction prefetching device as recited in claim 1, wherein
   (a) said renewing means is responsive to the predicted direction evaluation signal in said second state irrespective of the result of the discrimination means, for updating a current address to the first entry of the branch history table and updating an actual branch destination address to the corresponding second entry,
   (b) said renewing means further being responsive to the predicted direction evaluation signal in the first state and the predicted address evaluation signal in the second state, for updating an actual branch destination address,
   (c) said renewing means responsive to the result of discrimination in a general branch instruction, when the actual branch direction shows NO GO and the predicted direction evaluation signal is in said second state, for invalidating contents of the first entry and the corresponding second entry of an entry pair,
   (d) said renewing means responsive to the result of discrimination in the branch on count instruction, so as not to update the contents of the branch history table, when the predicted address evaluation signal takes a first state, and
   (e) said renewing means responsive to the result of discrimination being a branch on count instruction when the predicted address evaluation signal assumes a second state, for updating an actual branch destination address.

11. An instruction prefetching device for use in carrying out prefetch of an instruction sequence in a data processing system which includes an executing unit, said instruction prefetching device comprising:
   a branch history table for storing a plurality of entry pairs, each entry pair comprising a first entry specifying an instruction address of a branch instruction executed by said executing unit prior to said prefetch and a corresponding second entry specifying branch information which comprises a predicted branch destination address obtained by previous execution of said branch instruction;
   retrieving means connected to said branch history table for retrieving said corresponding second entry from said branch history table in response to a current instruction address of a current instruction being prefetched when said current instruction address specifies one of said first entries;
   discriminating means connected to said executing unit for discriminating whether said branch instruction executed by said executing unit is a branch count instruction or a general branch instruction and providing a result of discrimination; and
   prefetching means responsive to said corresponding second entry retrieved by said retrieving means and responsive to said result of discrimination for carrying out said prefetch, wherein said prefetching means comprises:
   prediction evaluating means, connected to receive said corresponding second entry, said result of discrimination, and a resulting address of execution based on said current instruction, for evaluating said corresponding second entry to produce a predicted direction evaluation signal and a predicted address evaluation signal,
   said predicted direction evaluation signal existing in one of:
   (1) a first state, wherein at least one more execution of a program loop is required, and
   (2) a second state, wherein said program loop is to be exited,
   said predicted address evaluation signal existing in one of:
   (1) a first state, wherein said predicted branch destination address of said corresponding second entry coincides with said resulting address of execution, and
   (2) a second state, wherein said predicted branch destination address of said corresponding second entry does not coincide with said resulting address of execution;
   controlling means, connected to receive said corresponding second entry, said predicted direction evaluation signal and said predicted address evaluation signal, for continuing said prefetch when said predicted direction evaluation signal is in said first state, and
   wherein said prefetching means further comprises:
   penultimate detection means responsive to a count value "1" for the number of loops given from said execution unit to generate a penultimate signal and to facilitate carrying out said prefetch of said instruction sequence.

12. An instruction prefetching device as claimed in claim 11, wherein said prefetching means further comprises:
   (a) renewing means responsive to the result of discrimination in a general branch instruction when the actual branch direction shows GO and the predicted direction evaluation signal is in said second state, for updating a current address to said first entry and updating an actual branch destination address to said corresponding second entry,
   (b) said renewing means is responsive to the predicted direction evaluation signal in the first state and the predicted address evaluation signal in the second state when the actual branch direction shows GO, for updating an actual branch destination address to said corresponding second entry,
   (c) said renewing means responsive to the predicted direction evaluation signal in the second state when the actual branch direction shows NO GO, for invalidating contents of said first entry and said corresponding second entry of an entry pair, and
   (d) said renewing means responsive to the result of discrimination in a branch on count instruction when the actual branch direction shows GO, the predicted direction evaluation and the predicted address evaluation are in a first state, and the penultimate signal is generated from said penultimate detection means, for invalidating contents of said first entry and said corresponding second entry of an entry pair.

13. An instruction prefetching device as claimed in claim 11, wherein said prefetching means further comprises:
   (a) renewing means responsive to the result of discrimination in a general branch instruction when the actual branch direction shows GO and the predicted direction evaluation signal takes a second state, for updating a current address to said first entry and updating an actual branch destination address to said corresponding second entry, (b) said renewing means responsive to the predicted direction evaluation signal in the first state and the predicted address evaluation signal in the second state when the actual branch direction shows GO, for updating an actual branch destination address to said corresponding second entry, (c) said renewing means responsive to the predicted direction evaluation signal in the second state when the actual branch direction shows NO GO, for invalidating contents of said first entry and said corresponding second entry of an entry pair, (d) said renewing means responsive to the result of discrimination in a branch on count instruction when the actual branch direction shows NO GO, and the predicted direction evaluation signal takes a first state, for updating a current address to said first entry and updating an actual branch destination address to said corresponding second entry.

14. An instruction prefetching device as claimed in claim 11, wherein said prefetching means further comprises:

(a) renewing means responsive to the result of discrimination in a general branch instruction when the actual branch direction shows GO and the predicted direction evaluation signal takes a second state, for updating a current address to said first entry and updating an actual branch destination address to said corresponding second entry, (b) said renewing means responsive to the predicted direction evaluation signal in the first state and the predicted address evaluation signal in the second state when the actual branch direction shows GO, for updating an actual branch destination address to said corresponding second entry, (c) said renewing means responsive to the predicted direction evaluation signal in the second state when the actual branch direction shows NO GO, for invalidating contents of said first entry and said corresponding second entry of an entry pair, (d) said renewing means responsive to the result of discrimination in a branch on count instruction when the actual branch direction shows GO, the predicted direction evaluation and predicted address evaluation signals are in said first state, and the penultimate signal is generated from said penultimate detection means, for invalidating contents of said first entry and said corresponding second entry of an entry pair, and (e) said renewing means responsive to the predicted direction evaluation signal in the first state when the actual branch direction shows NO GO, for updating a current address to said first entry and updating an actual branch destination address to said corresponding second entry.

15. An instruction prefetching device as claimed in claim 11, wherein said prefetching means further comprises:

(a) renewing means responsive to the result of discrimination in a general branch instruction when the actual branch directions shows GO and the predicted direction evaluation signal is in said second state, for updating a current address to said first entry and updating an actual branch destination address to said corresponding second entry, (b) said renewing means responsive to the predicted direction evaluation signal in the first state and the predicted address evaluation signal in the second state when the actual branch direction shows GO, for updating an actual branch destination address to said corresponding second entry, (c) said renewing means responsive to the predicted direction evaluation signal in the second state when the actual branch direction shows NO GO, for invalidating contents of said first entry and said corresponding second entry of an entry pair, (d) said renewing means responsive to the result of discrimination in a branch on count instruction when the actual branch direction shows GO, the predicted direction evaluation and predicted address evaluation signals are in said first state, and the penultimate signal is generated from said penultimate detection means, for invalidating contents of said first entry and said corresponding second entry of an entry pair, (e) said renewing means responsive to the predicted direction evaluation signal in the second state when the actual branch direction shows GO and the penultimate signal is generated from said penultimate detection means, for inhibiting the update operation of the branch history table, and (f) said renewing means responsive to the predicted direction evaluation in the first state when the actual branch direction shows NO GO, for updating a current address to said first entry and updating an actual branch destination address to said corresponding said second entry.

16. An instruction device as claimed in claim 11, wherein said prefetching means further comprises:

(a) renewing means responsive to the result of discrimination in a general branch instruction when the actual branch direction shows GO and the predicted direction evaluation signal is in said second state, for updating a current address to said first entry and updating an actual branch destination address to said corresponding second entry, (b) said renewing means responsive to the predicted direction evaluation signal in the first state and the predicted address evaluation signal in the second state when the actual branch direction shows GO, for updating an actual branch destination address to said corresponding second entry, (c) said renewing means responsive to the predicted direction evaluation signal in the second state when the actual branch direction shows NO GO, for invalidating contents of said first entry and said corresponding second entry of an entry pair, (d) said renewing means responsive to the result of discrimination in a branch on count instruction when the actual branch direction shows GO, the predicted direction evaluation signal is in said first state, and the penultimate signal is generated from said penultimate detection means, irrespective of the predicted address evaluation signal, for invalidating contents of said first entry and said corresponding second entry of an entry pair, (e) said renewing means responsive to the result of discrimination in the branch on count instruction so as not to update the contents of the branch history table, when the actual branch direction shows GO, the predicted direction evaluation signal is in said second state, and the penultimate signal in generated from said penultimate detection means;

(f) said renewing means responsive to the predicted direction evaluation signal in the first state when the actual branch direction shows NO GO, for updating a current address to said first entry and updating an actual branch destination address to said second entry;

(g) said renewing means responsive to the predicted direction evaluation signal in the second state and the predicted address evaluation signal in the first state, so as not to update the contents of the branch history table, when the actual branch direction shows NO GO; and (h) said renewing means responsive to the predicted direction evaluation signal in the second state, and the predicted evaluation signal in the second state when the actual branch direction shows NO GO, for updating an actual branch destination address.

* * * * *